(12) United States Patent
Shirasaki

(10) Patent No.: US 7,953,606 B2
(45) Date of Patent: May 31, 2011

(54) CHECKOUT APPARATUS, SHOPPING CART, CHECKOUT METHOD, AND PROGRAM FOR CAUSING COMPUTER TO EXECUTE THE METHOD

(75) Inventor: Ryuichi Shirasaki, Osaka (JP)

(73) Assignee: The Japan Research Institute, Limited, Tokyo (JP)

( * ) Notice: Subject to any disclaimer, the term of this patent is extended or adjusted under 35 U.S.C. 154(b) by 964 days.

(21) Appl. No.: 10/492,357

(22) PCT Filed: Dec. 12, 2002

(86) PCT No.: PCT/JP02/13028
§ 371 (c)(1),
(2), (4) Date: Apr. 13, 2004

(87) PCT Pub. No.: WO03/054822
PCT Pub. Date: Jul. 3, 2003

(65) Prior Publication Data
US 2004/0249717 A1 Dec. 9, 2004

(30) Foreign Application Priority Data
Dec. 13, 2001 (JP) ................................. 2001-380470

(51) Int. Cl.
*G06Q 90/00* (2006.01)
*B62D 39/00* (2006.01)
(52) U.S. Cl. ................. 705/1.1; 280/33.991; 280/33.992
(58) Field of Classification Search .................. 235/383; 186/58, 59, 61, 62, 63; 280/47.26, 33.991, 280/33.992, 33.993, 33.994, 33.995, 33.996, 33.997, 33.998, 47.11, 47.34, 200, 225, 224, 242.1, 79.11, 79.4, 79.5, 79.3
See application file for complete search history.

(56) References Cited

U.S. PATENT DOCUMENTS

| | | | | |
|---|---|---|---|---|
| 4,071,740 | A * | 1/1978 | Gogulski | 235/431 |
| 4,442,631 | A * | 4/1984 | Weber | 49/199 |
| 5,899,980 | A * | 5/1999 | Wilf et al. | 705/26 |
| 6,435,407 | B1 * | 8/2002 | Fiordelisi | 235/383 |
| 6,910,697 | B2 * | 6/2005 | Varatharajah et al. | 280/33.992 |

FOREIGN PATENT DOCUMENTS

| | | |
|---|---|---|
| EP | 623904 A1 | 11/1994 |
| JP | 6-20166 A | 1/1994 |

(Continued)

OTHER PUBLICATIONS

Notification of Transmittal of Translation of the International Preliminary Examination Report, PCT Rule 72.2, :English Translation, references previously filed.

(Continued)

*Primary Examiner* — Janice Mooneyham
*Assistant Examiner* — Gerardo Araque, Jr.
(74) *Attorney, Agent, or Firm* — Sughrue Mion, PLLC

(57) ABSTRACT

A checkout apparatus is arranged in a shopping cart. The checkout apparatus includes an ID information inputting section to input customer ID information, an article identification information reading section that reads article identification information, an article information acquiring section which acquires article information of the article, and a checkout process section which performs a checkout process of the cost of the article on the basis of the acquired article information by using the input customer ID information.

16 Claims, 25 Drawing Sheets

FOREIGN PATENT DOCUMENTS

| | | |
|---|---|---|
| JP | 6-223087 A | 8/1994 |
| JP | 7-73380 A | 3/1995 |
| JP | 7-152964 A | 6/1995 |
| JP | 7-272126 A | 10/1995 |
| JP | 9-115060 A | 5/1997 |
| JP | 2001-216567 A | 8/2001 |
| JP | 2001-222766 A | 8/2001 |
| JP | 2001-307229 A | 11/2001 |

OTHER PUBLICATIONS

Japanese Office Action dated Feb. 3, 2009.

\* cited by examiner

FIG.6

| BAR CODE NUMBER | NAME OF ARTICLE | UNIT PRICE (GROUP A) | UNIT PRICE (GROUP B) | UNIT PRICE (GROUP C) | ... | WEIGHT |
|---|---|---|---|---|---|---|
| ○○○○1 | ONION | 98 | 108 | 118 | ... | 50g |
| ○○○○2 | POTATO | 69 | 75 | 80 | ... | 30g |
| ......... | ......... | ......... | ......... | ......... | ......... | ......... |

PLEASE CHECK THE ARTICLES, BECAUSE,
AN ARTICLE THAT IS NOT PURCHASED IS THERE IN THE BASKET.

IF THERE IS AN ARTICLE THAT IS NOT PURCHASED,
PLEASE MAKE PURCHASING PROCESS.

CONFIRMATION

1901

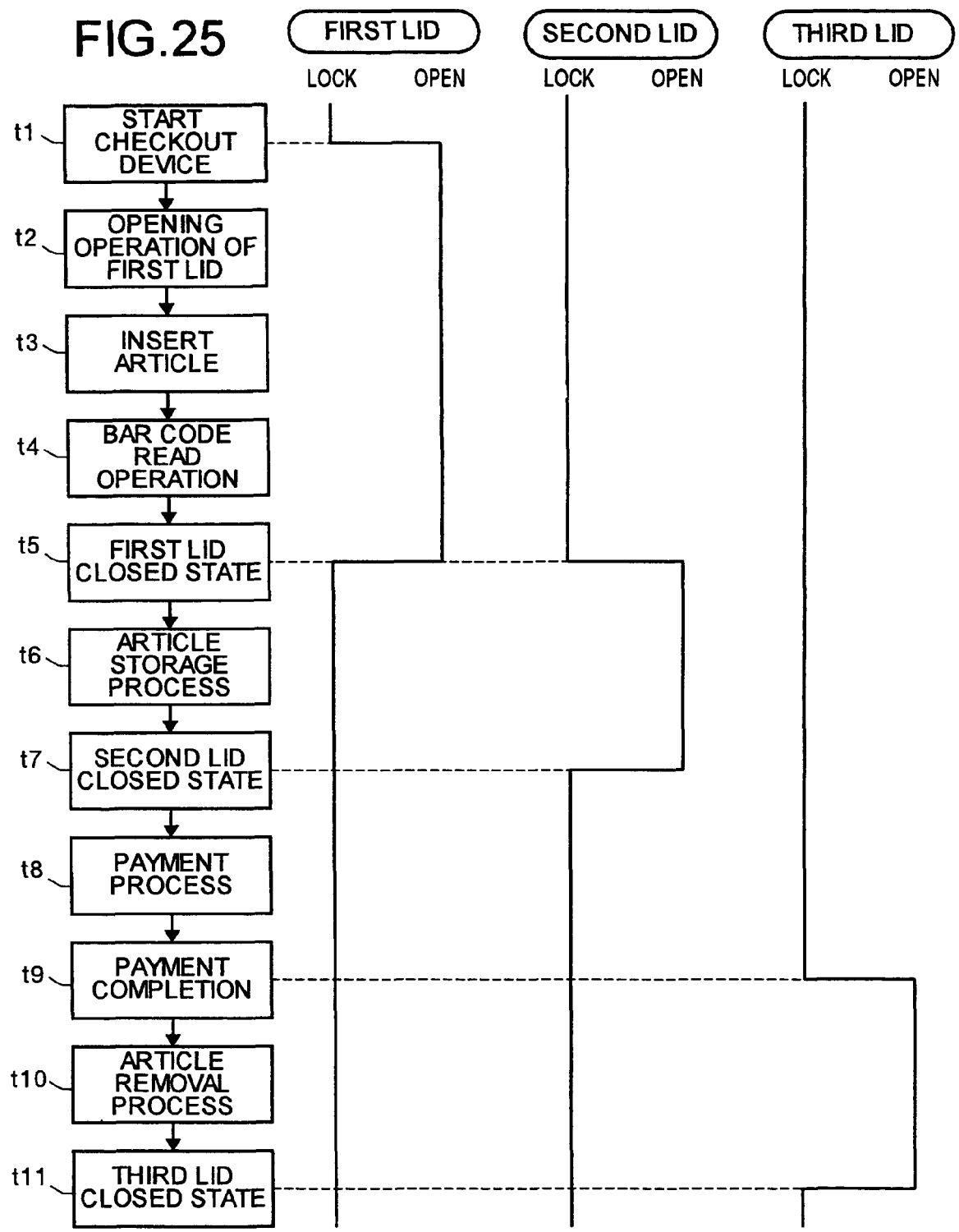

CHECKOUT APPARATUS, SHOPPING CART, CHECKOUT METHOD, AND PROGRAM FOR CAUSING COMPUTER TO EXECUTE THE METHOD

Priority is claimed from PCT application PCT/JP02/13028, filed Dec. 12, 2002, which itself claims priority from Japanese Application 2001-380470 filed on Dec. 13, 2001.

TECHNICAL FIELD

The present invention relates to a checkout apparatus used to settle the payments of an article purchased in a super market or the like, a shopping cart equipped with the checkout apparatus, a checkout method, and a program which causes a computer to execute the method.

BACKGROUND ART

Conventionally, in super market or the like, a customer carries a shopping cart to a place where desired articles are displayed and puts a desired article in the shopping cart. This operation is repeated for the number of desired articles, and the customer then generally stands, with the shopping cart, in a queue to settle the payment.

Conventionally, the processes such as setting of the prices of the displayed articles and changing of the prices once set are performed manually.

However, generally there is a limit on the number of cash registers. Therefore, in the conventional method, when a large number of customers head for the cash registers, the registers get jammed with the customers, and long time is required to complete the checkout operations for all the customers.

Moreover, because the processes such as setting of the prices of the articles and changing of the prices once are performed manually, there is a lot of load on the workers. In addition, since the processes of setting and changing of the prices of the articles are cumbersome, the prices cannot be easily changed. Since the prices of articles are uniquely determined, different prices cannot be easily set in units of articles for customers, respectively. For this reason, the stores cannot sufficiently perform sales promotion matched with customer needs.

The present invention has been made to solve the above problems, and has as its object to provide a checkout apparatus which can effectively perform a checkout process of the cost of purchased articles and which can easily set and change the prices of the articles to make it possible to perform sales promotion, as well as to provide a shopping cart, a checkout method, and a program which causes a computer to execute the method.

DISCLOSURE OF THE INVENTION

To solve the problems, a checkout apparatus according to the present invention is arranged in a shopping cart and comprises an ID information inputting unit to input customer ID information; an article identification information reading unit that, when an article to be purchased is put in a basket section of the shopping cart, reads article identification information attached to the article; an article information acquiring unit that acquires article information of the article based on the article identification information read by the article identification information reading unit; and a checkout process unit that performs a checkout process of a cost of the article from the article information acquired by the article information acquiring unit by using the customer ID information input by the ID information inputting unit. According to the present invention, a customer need not queue at a cash register, and the cash register itself is unnecessary.

Moreover, in the checkout apparatus according to the present invention, the ID information inputting unit is a card information reading unit that reads, as the customer ID information, information recorded on various cards such as a credit card of the customer. According to the present invention, a checkout operation can be performed by various cards such as a credit card.

Moreover, in the checkout apparatus according to the present invention, the ID information inputting unit is a connection unit that connects in a communicable manner the checkout apparatus to a mobile information terminal device of the customer. According to the present invention, a checkout operation can be performed by a mobile information terminal device.

Moreover, in the checkout apparatus according to the present invention, the article information acquiring unit acquires the article information of the article from the customer ID information input by the ID information inputting unit. According to the present invention, price of the article can be changed based on ID information of a customer.

Moreover, in the checkout apparatus according to the present invention, there are provided an article information receiving unit that communicates with a store server to receive article information stored in the store server; and an article information storage unit that stores the article information received by the article information receiving unit, wherein the article information acquiring unit acquires the article information from the article information storage unit. According to the present invention, latest article information can be rapidly obtained.

Moreover, in the checkout apparatus according to the present invention, there is provided a display unit that displays all or part of the article information acquired by the article information acquiring unit. According to the present invention, a customer can be easily notified of the condition of an article to be purchased or a state related to an amount of prices of articles to be purchased.

Moreover, in the checkout apparatus according to the present invention, the display unit displays the article information acquired by the article information acquiring unit as a list. According to the present invention, a checkout apparatus which can easily notify a customer of the condition of an article to be purchased and which can prevent from forgetting to purchase an article can be obtained.

Moreover, in the checkout apparatus according to the present invention, the display unit displays a total amount of a cost of an article related to the article information acquired by the article information acquiring unit. A customer can be easily notified of information related to an amount of the prices of articles to be purchased, and can be designedly caused to perform selection and purchasing of the articles in relation to estimated cost.

Moreover, in the checkout apparatus according to the present invention, there are provided an article identification information inputting unit to input identification information of an article to be purchase; a delivery address information inputting unit to input information related to a delivery address of an article related to the identification information input by the article identification information inputting unit; and a transmitting unit that transmits the identification information input by the article identification inputting unit and delivery address information input by the delivery address information inputting unit to the store server, wherein the article information acquiring unit acquires the article information of the article from the identification information input by the article identification information inputting unit. According to the present invention, in purchasing of regular articles, a customer can be caused to purchase an article which cannot be put in the shopping cart together with other articles or an article which cannot be taken out.

Moreover, in the checkout apparatus according to the present invention, there are provided a measured weight information inputting unit to input information related to a measured weight of an article put in the basket section; a weight information acquiring unit that acquires information related to the weight of an article related to the article identification information read by the article identification information reading unit; and a comparing unit that compares the weight of the article input by the measured weight information inputting unit with a total amount of the weight information acquired by the weight information acquiring unit. According to the present invention, a checkout apparatus which can prevent mistakes or illegal acts in a checkout process and which can efficiently perform a checkout process of the cost of an article to be purchased can be obtained advantageously.

Moreover, in the checkout apparatus according to the present invention, there is provided a warning information outputting unit that outputs warning information on the basis of a comparison result obtained by the comparing unit. According to the present invention, a customer who is an operator can be notified that a checkout process cannot be correctly performed.

Moreover, in the shopping cart apparatus according to the present invention, since the checkout apparatus according to the invention is arranged, a shopping cart which can efficiently perform a checkout process of the cost of an article to be purchased can be obtained advantageously.

Moreover, in the shopping cart apparatus according to the present invention, there is provided on the bottom of a basket section of the shopping cart, a weight measurement unit that measures the weight of an article put in the basket section. According to the present invention, the weight of an article put in a basket section can be known, and the weight of the article can be easily compared with a total amount of calculated weights of articles subjected to a checkout process.

Moreover, in the shopping cart apparatus according to the present invention, there are provided an article removal lid member that opens or closes when an article put in the basket section is removed; and a control unit that controls an opening/closing operation of the article removal lid member. According to the present invention, a customer can be regulated such that an article is prevented from being removed from a basket section.

Moreover, in the checkout method according to the present invention, is a checkout method of performing a check out using a checkout apparatus that is arranged in a shopping cart, comprises an ID information inputting step of inputting customer ID information; an article identification information reading step of reading, when an article to be purchased is put in a basket section of the shopping cart, article identification information attached to the article; an article information acquiring step of acquiring article information of the article based on the article identification information read at the article identification information reading step; and a checkout process step of performing a checkout process of a cost of the article from the article information acquired at the article information acquiring step by using the customer ID information input at the ID information inputting step. According to the present invention, a customer need not queue at a cash register to settle prices, and a cash register itself is unnecessary.

Moreover, in the checkout method according to the present invention, the article information acquiring step includes acquiring the article information of the article from the customer ID information input at the ID information inputting step. According to the present invention, it is possible to change the price of an article depending on customer ID information.

Moreover, in the checkout method according to the present invention, there is provided a display step of displaying all or part of the article information acquired at the article information acquiring step. According to the present invention, a customer can be easily notified of the condition of an article to be purchased or a state related to an amount of prices of articles to be purchased.

Moreover, in the checkout method according to the present invention, the display step includes displaying the article information acquired at the article information acquiring step as a list. According to the present invention, it is possible to easily notify a customer of the condition of an article to be purchased and which can prevent from forgetting to purchase an article.

Moreover, in the checkout method according to the present invention, the display step includes displaying a total amount of a cost of an article related to the article information acquired at the article information acquiring step. According to the present invention, a customer can be easily notified of information related to an amount of prices of articles to be purchased.

Moreover, in the checkout method according to the present invention, there are provided an article identification information inputting step of inputting identification information of an article to be purchase; a delivery address information inputting step of inputting information related to a delivery address of an article related to the identification information input at the article identification information inputting step; and a transmitting step of transmitting the identification information input at the article identification inputting step and delivery address information input at the delivery address information inputting step to the store server, wherein the article information acquiring step includes acquiring the article information of the article from the identification information input at the article identification information inputting step. According to the present invention, in purchasing of regular articles, a customer can be caused to purchase an article which cannot be put in the shopping cart together with other articles or an article which cannot be taken out.

Moreover, in the checkout method according to the present invention, there are provided a measured weight information inputting step of inputting information related to a measured weight of an article put in the basket section; a weight information acquiring step of acquiring information related to the weight of an article related to the article identification information read at the article identification information reading step; and a comparing step of comparing the weight of the article input at the measured weight information inputting step with a total amount of the weight information acquired at the weight information acquiring step. According to the present invention, it can be easily determined that an article the identification information is not read is put in a basket section.

Moreover, the computer program according to the present invention causes a computer to execute any one of a checkout method according to the invention.

BRIEF DESCRIPTION OF THE DRAWINGS

FIG. 6 is an explanatory diagram of a data configuration of an article information storage section of the checkout apparatus according to the embodiment of the invention;

FIG. 19 is an explanatory diagram of still other display contents of the display screen of the checkout apparatus according to the embodiment of the invention;

FIG. 25 is an explanatory diagram of the operation contents of a lid locking mechanism of the shopping cart according to the embodiment of the invention.

BEST MODE FOR CARRYING OUT THE INVENTION

Preferable embodiments of a checkout apparatus, a shopping cart, a checkout method, and a program which causes a computer to execute the method according to the invention will be described below.

(Checkout System Configuration of Embodiment)

Figure 1:
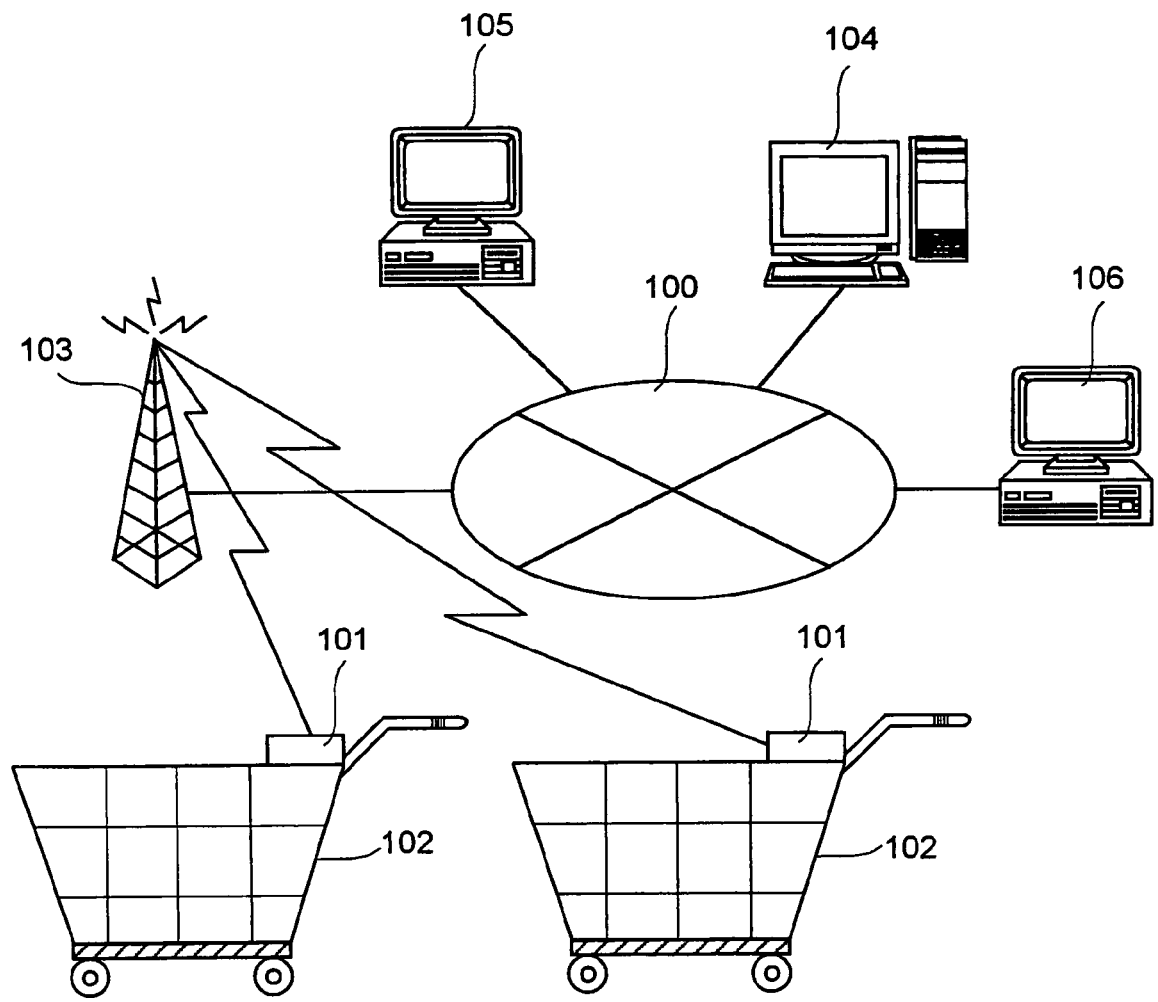
FIG. 1 is an explanatory diagram of a system configuration according to an embodiment of the invention.

The system configuration of an embodiment of the invention will be described below. FIG. 1 is an explanatory diagram of the system configuration of a checkout system, which uses a shopping cart, according to the embodiment of the invention. As shown in FIG. 1, the checkout system includes a shopping cart 102 in which a checkout apparatus 101 according to the embodiment is set, an antenna 103 that can perform wireless communications with the checkout apparatus 101, a store server 104, an article handover-location terminal device 105, and an article delivery-center terminal device 106. The antenna 103 that can communicate with the checkout apparatus 101 set in the shopping cart 102 moving in a store, the store server 104, the article handover-location terminal device 105 that is installed at an article handover location such as a parking space where articles are turned over, and the article delivery-center terminal device 106 that is installed at an article delivery center which performs a delivery process for articles are connected to each other through a network 100 such as a LAN or the Internet.

(Appearance of Shopping Cart)

Figure 2:
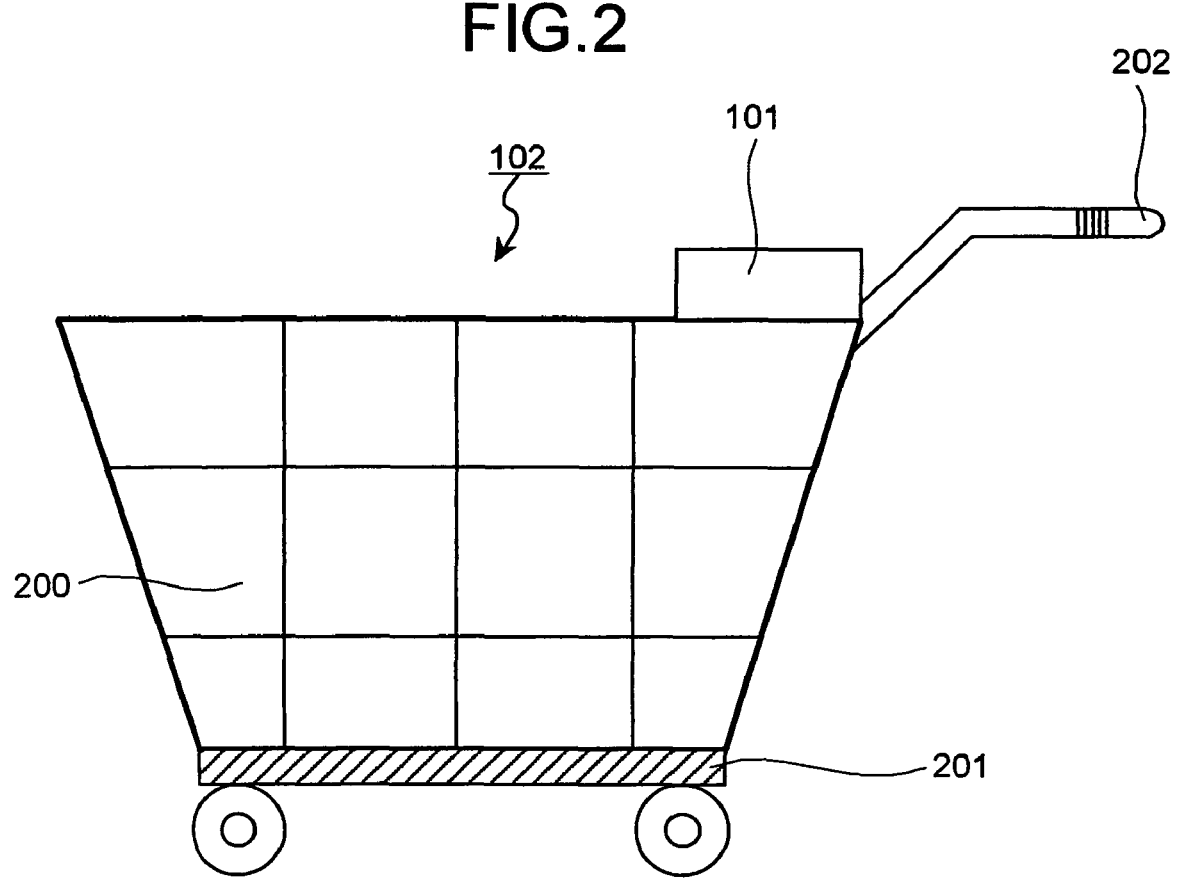
FIG. 2 is an explanatory diagram of the appearance of a shopping cart according to the embodiment of the invention.

The appearance of the shopping cart 102 according to the embodiment of the invention will be described below. FIG. 2 is an explanatory diagram of the appearance of the shopping cart according to the embodiment of the invention. In FIG. 2, the shopping cart 102 includes a basket unit 200 in which articles are to be put, and has the same shape and functions as those of the conventionally known shopping carts. In addition, in the shopping cart 102, the checkout apparatus 101 according to the embodiment is arranged on the upper side of the shopping cart 102 and near a grip 202, which a customer, who is an operator, catches.

The shopping cart 102 comprises a weight sensor 201 on the bottom of the basket unit 200 to measure the weight of the articles put in the basket unit 200. The weight sensor 201 makes it possible to always monitor the total weight of articles put in the basket unit 200.

(Appearance of Checkout Apparatus)

Figure 3:
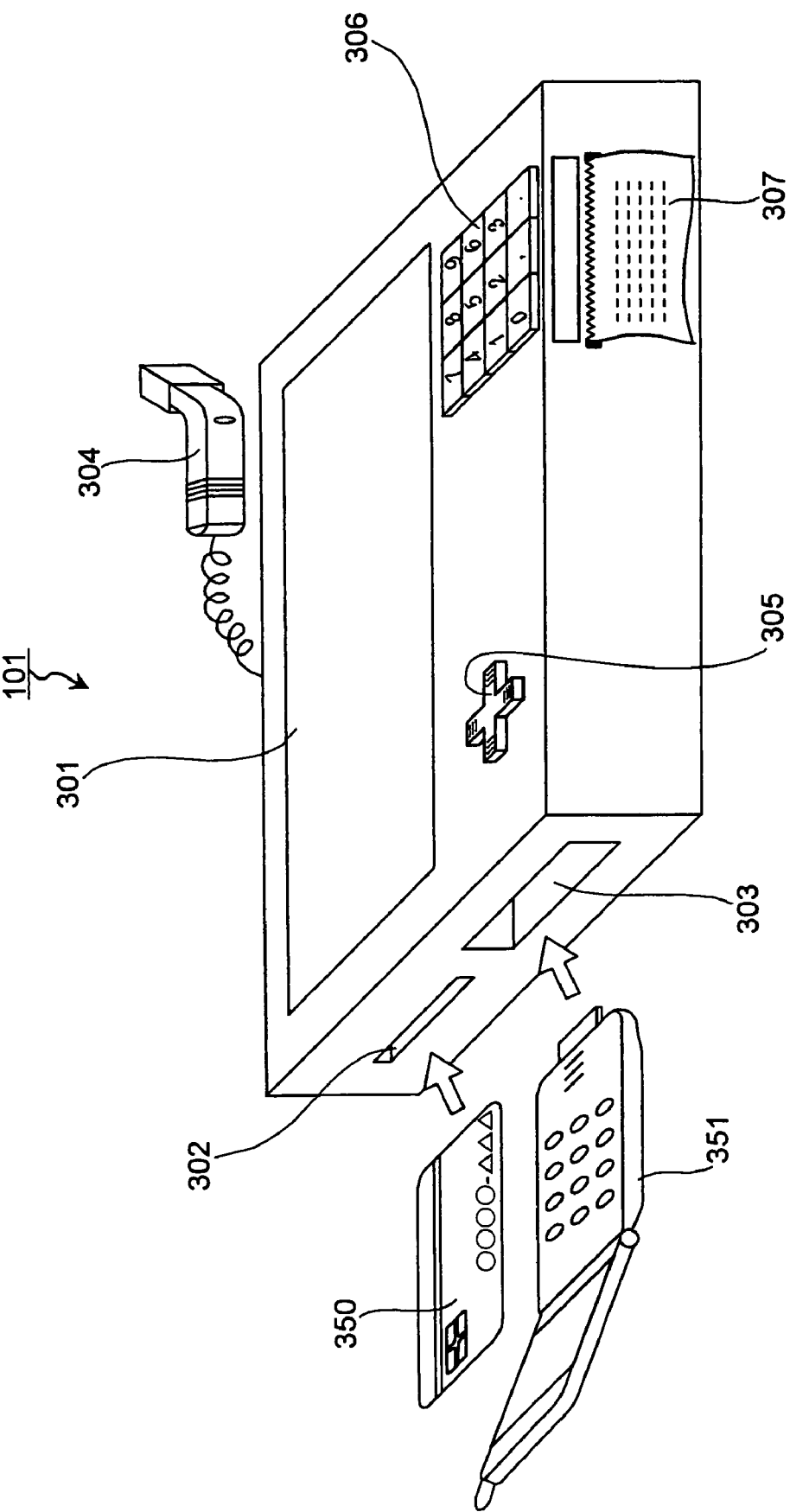
FIG. 3 is an explanatory diagram of the appearance of a checkout apparatus according to the embodiment of the invention.

The appearance of the checkout apparatus 101 according to the embodiment of the invention will be described below. FIG. 3 is an explanatory diagram of the appearance of the checkout apparatus according to the embodiment of the invention. As shown in FIG. 3, the checkout apparatus 101 includes a display screen 301, a card slot 302 to insert a card 350, a mobile phone connection port 303 to connect a mobile phone (including a mobile information terminal device such as a PDA), a bar-code reader 304 which is used by a customer to read a bar code attached to an article, a cross key 305, a ten key pad 306, and a receipt outlet 307.

(Hardware Configuration of Checkout Apparatus)

Figure 4:
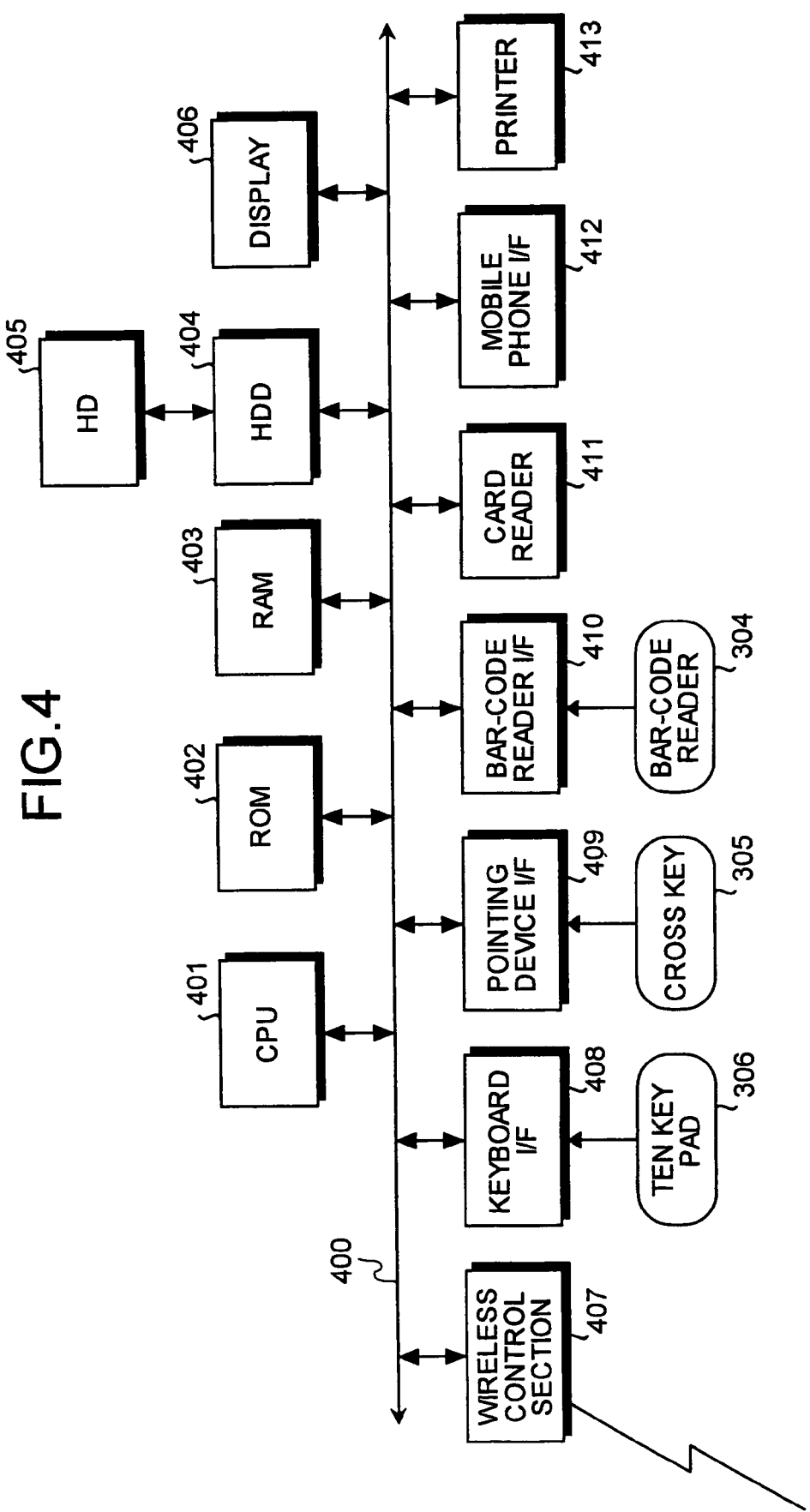
FIG. 4 is an explanatory diagram (block diagram) of the hardware configuration of the checkout apparatus according to the embodiment of the invention.

The hardware configuration of the checkout apparatus according to the embodiment of the invention will be described below. FIG. 4 is an explanatory diagram (block diagram) of the hardware configuration of the checkout apparatus according to the embodiment of the invention. Reference numeral 401, shown in FIG. 4, denotes a CPU for controlling the entire device; 402 denotes a ROM in which a basic input/output program is stored; and 403 denotes a RAM used as a work area of the CPU 401.

Reference numeral 404 denotes a HDD (hard disk drive) which performs read/write operations of data for an HD (hard disk) 405 under the control of the CPU 401; and 405 denotes the HD which stores data written under the control of the HDD 404.

Reference numeral 406 denotes a display that displays cursors, menus, windows, or various data such as characters and images; and 407 denotes a wireless control section connected to the network 100 through the antenna 103 by wireless communication, connected to the store server 104 through the network 100, functioning as an interface between the store server 104 and the CPU 401. Reference numeral 408 denotes a keyboard I/F functioning as an interface between a keyboard having a plurality of keys (software keys displayed on the display screen 301) inducing the ten key pad 306 for inputting characters, numeric values, and various designations; and 409 denotes a pointing device I/F functioning as an interface between a pointing device which performs selection or execution of various designation, selection of an object to be processed, and movement of a cursor and the CPU 401.

Reference numeral 410 denotes a bar-code reader I/F functioning as an interface between the bar-code reader 304 and the CPU 401; and 411 denotes a card reader which reads the card 350 such as a credit card inserted into the card slot 302. The card reader 411 has a reading mechanism such as a magnetic reader or a contact-type IC card reader (terminal) for reading information stored in the card 350.

Reference numeral 412 denotes a mobile telephone I/F functioning as an interface between a mobile phone 351 connected to the mobile phone connection port 303 and the CPU; and 413 denotes a printer which prints characters and images under the control of the CPU 401. Reference numeral 400 denotes a bus which connects the above components to each other.

(Functional Configuration of Checkout Apparatus)

Figure 5:
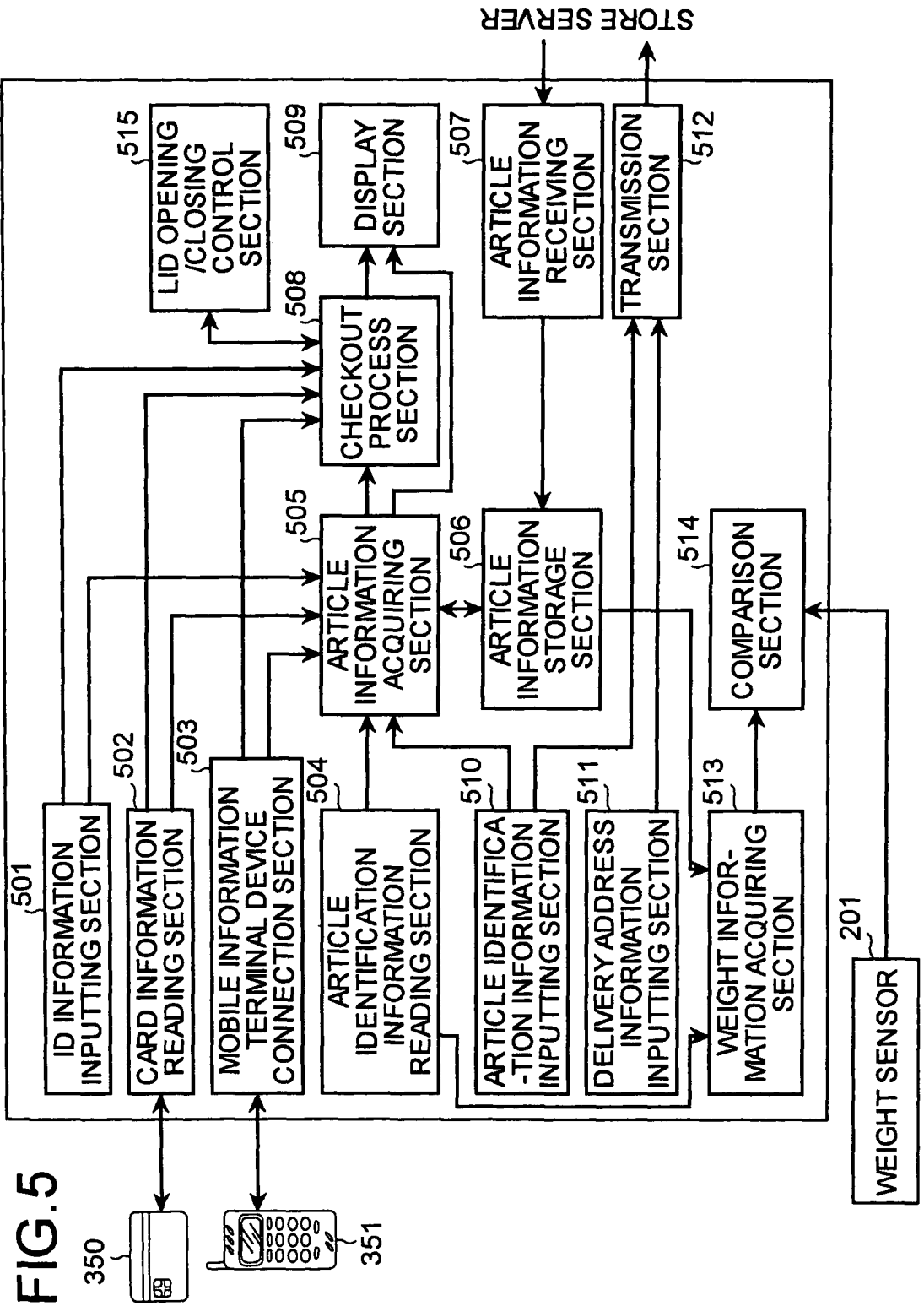
FIG. 5 is an explanatory diagram (block diagram) of the functional configuration of the checkout apparatus according to the embodiment of the invention.

The functional configuration of the checkout apparatus according to the embodiment of the invention will be described below. FIG. 5 is an explanatory diagram (block diagram) of the functional configuration of the checkout apparatus according to the embodiment of the invention. As shown in FIG. 5, the checkout apparatus 101 includes an ID information inputting section 501, a card information reading section 502, a mobile information terminal device connection section 503, an article identification information reading section 504, an article information acquiring section 505, an article information storage section 506, an article information receiving section 507, a checkout process section 508, a display section 509, an article identification information inputting section 510, a delivery address information inputting section 511, a transmission section 512, a weight information acquiring section 513, a comparison section 514, and a lid closing/opening control section 515.

The ID information inputting section 501 inputs ID information of customers. More specifically, for example, the function can be realized by the ten key pad 306 shown in FIG. 3, the keyboard I/F 408 shown in FIG. 4, the pointing device I/F 409, and the like.

The card information reading section 502 reads, as the ID information of a customer, the information recorded on various cards 350 such as customer's credit card inserted into the card slot 302. More specifically, for example, the function of the card information reading section 502 can be realized by the card slot 302 shown in FIG. 3, the card reader 411, shown in FIG. 4, and the like. In this manner, a checkout process can be executed by various cards such as a credit card.

The mobile information terminal device connection section 503 connects the customer mobile phone 351 and the checkout apparatus 101 to make it possible to communicate the mobile phone 351 with the checkout apparatus 101. More specifically, for example, the function of the mobile information terminal device connection section 503 is realized by the mobile phone connection port 303 shown in FIG. 3 and the mobile telephone I/F 412 shown in FIG. 4. In this manner, a checkout operation can be executed by the mobile information terminal device.

The article identification information reading section 504 reads article identification information (bar code) attached to an article (not shown) when an article to be purchased is put in the basket unit 200 of the shopping cart 102. More specifically, for example, the function of the article identification information reading section 504 is realized by the bar-code reader 304 shown in FIG. 3, the bar-code reader I/F 410 shown in FIG. 4, and the like.

The article information acquiring section 505 acquires article information of article on the basis of article identification information (bar code) read by the article identification information reading section 504 from the article information storage section 506. More specifically, for example, a program recorded on the ROM 402, the RAM 403, and the HD 405 shown in FIG. 4 is executed by the CPU 401 to realize the function of the article information acquiring section 505. More specifically, the function of the article information storage section 506 is realized by the RAM 403 or the HD 405 shown in FIG. 4.

The article information acquiring section 505 acquires article information of an article on the basis of ID information of a customer input by the ID information inputting section 501, the card information reading section 502, or the mobile information terminal device connection section 503. In this case, accordingly, the article information storage section 506 can change the price of the article depending on the ID information of the customer.

The article information receiving section 507 communicates with the store server 104 shown in FIG. 1 to receive article information stored in the store server 104. More specifically, the function of the article information receiving section 507 is realized by the wireless control section 407 or the like shown in FIG. 4. The received article information is stored in the article information storage section 506. In this manner, the latest article information can be rapidly acquired.

On the basis of the article information acquired by the article information acquiring section 505, the checkout process section 508 performs a checkout process of the price of an article put in the basket unit 200 of the shopping cart 102 by using the customer ID information input by the ID information inputting section 501, the card information reading section 502, or the mobile information terminal device connection section 503. More specifically, a program recorded on the ROM 402, the RAM 403, the HD 405, or the like shown in FIG. 4 is executed by the CPU 401 to realize the function of the checkout process section 508. In this manner, the customer need not queue at a cash register to settle the price, and the cash register it self is not necessary.

The display section 509 entirely or partially displays article information acquired by the article information acquiring section 505, or displays information related to the cost of an article subjected to a checkout process by the checkout process section 508. More specifically, for example, the function of the display section 509 is realized by the display screen 301 (the display 406 shown in FIG. 4) shown in FIG. 3. In this manner, the customer can be easily notified of the condition of purchased articles or the condition of an amount of purchased articles.

The display section 509 can display article information acquired by the article information acquiring section 505 as a list. In this manner, the customer can be easily notified of the condition of purchased articles, and can be prevented from forgetting to purchase an article.

The display section 509 can display a total amount of the costs of articles related to the article information acquired by the article information acquiring section 505. More specifically, the display section 509 comprises an adder (not shown) which adds the costs of an article each time article information is acquired by the article information acquiring section 505. The display section 509 displays the total amount obtained by the adding process executed by the adder on the display screen 301 (display 406).

The article identification information inputting section 510 inputs identification information of an article to be purchased. More specifically, for example, the function of the article identification information inputting section 510 is realized by the bar-code reader 304 shown in FIG. 3 and the bar-code reader I/F 410 shown in FIG. 4, the ten key pad 306 shown in FIG. 3, a software keyboard displayed on the display screen 301, and the keyboard I/F 408 shown in FIG. 4, or the like.

The delivery address information inputting section 511 inputs information relating to a delivery address of an article related to the identification information input by the article identification information inputting section 510. More specifically, for example, the function of the delivery address information inputting section 511 is realized by the ten key pad 306 shown in FIG. 3, a software keyboard displayed on the display screen 301, and the keyboard I/F 408 shown in FIG. 4, the cross key 305 shown in FIG. 3 and the pointing device I/F 409 shown in FIG. 4, or the like.

The transmission section 512 transmits the identification information input by the article identification information inputting section 510 and the delivery address information input by the delivery address information inputting section 511 to the store server 104. More specifically, for example, the function of the transmission section 512 is realized by the wireless control section 407 or the like shown in FIG. 4. At this time, the article information acquiring section 505 acquires article information of the article on the basis of the identification information input by the article identification information inputting section 510.

The weight information acquiring section 513 acquires weight information of the article related to the article information read by the article identification information reading section 504 from the article information storage section 506. More specifically, a program recorded on the ROM 402, the RAM 403, the HD 405 or the like shown in FIG. 4 is executed by the CPU 401 to realize the function of the weight information acquiring section 513.

The comparison section 514 compares the weight of an article measured by the weight sensor 201 with the total amount of the weight information acquired by the weight information acquiring section 513. More specifically, for example, a program recorded on the ROM 402, the RAM 403, the HD 405, or the like shown in FIG. 4 is executed by the CPU 401 to realize the function of the comparison section 514.

The lid opening/closing control section 515 controls an opening/closing operation of an article pickup lid section 2014 (to be described later). The detailed contents of the opening/closing control will be described later. More specifically, for example, a program recorded on the ROM 402, the RAM 403, the HD 405, or the like shown in FIG. 4 is executed by the CPU 401 to realize the lid opening/closing control section 515.

(Data Configuration of Article Information Storage Section 506)

An example of the data configuration of the article information storage section (database) 506 of the checkout apparatus 101 according to the embodiment of the invention will be described below. FIG. 6 is an explanatory diagram of a data configuration of the article information storage section 506 of the checkout apparatus 101 according to the embodiment of the invention. In FIG. 6, pieces of information of article names, unit prices, weights, and the like are stored in accordance with bar code numbers. The pieces of information related to the unit prices are stored in units of groups (Group A, Group B, Group C, . . . ), respectively.

A corresponding one group is selected from these groups on the basis of customer ID information acquired by the ID information inputting section 501, the card information reading section 502, or the mobile information terminal device connection section 503. Therefore, unit prices of articles change depending on the pieces of ID information of customers. Since the ID information of a customer is changed depending on a frequency of using the store, the store can provide discount service to a specific customer as service for a so-called "important customer". Group selection is performed by using a customer ID information database (not shown) in which pieces of ID information of customers are related to the groups, respectively.

The weight information is transmitted to the comparison section 514 with a request from the weight information acquiring section 513 shown in FIG. 5. In addition, although not shown, information related to the explanation of an article, i.e., a place of production, an expiration date, a cooking method, or the like can be stored, and may be displayed on the display screen 301 shown in FIG. 3 as needed.

(Display of Display Screen 301)

Figure 7:
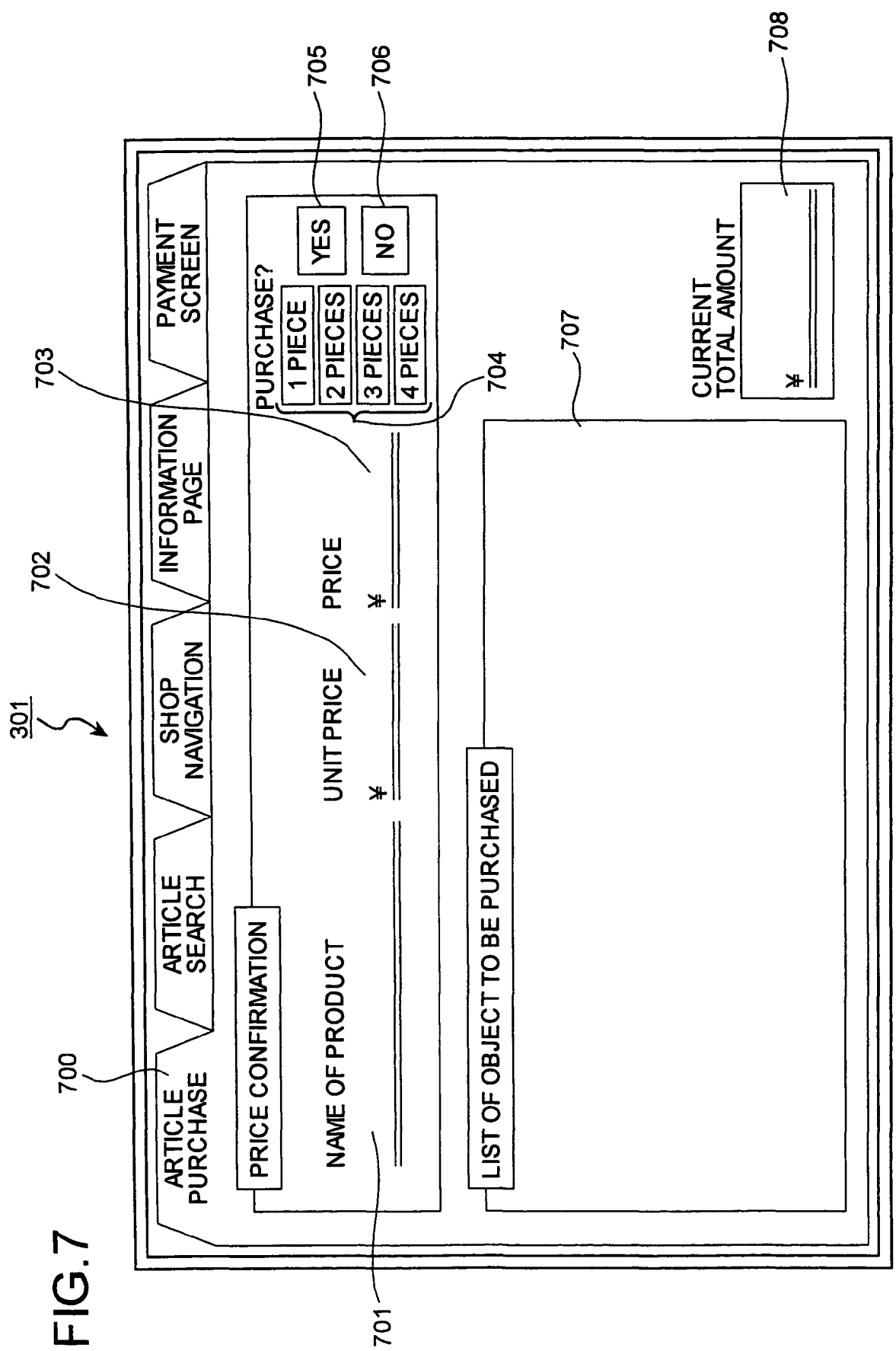
FIG. 7 is an explanatory diagram of the display contents of a display screen of the checkout apparatus according to the embodiment of the invention.
Figure 8:
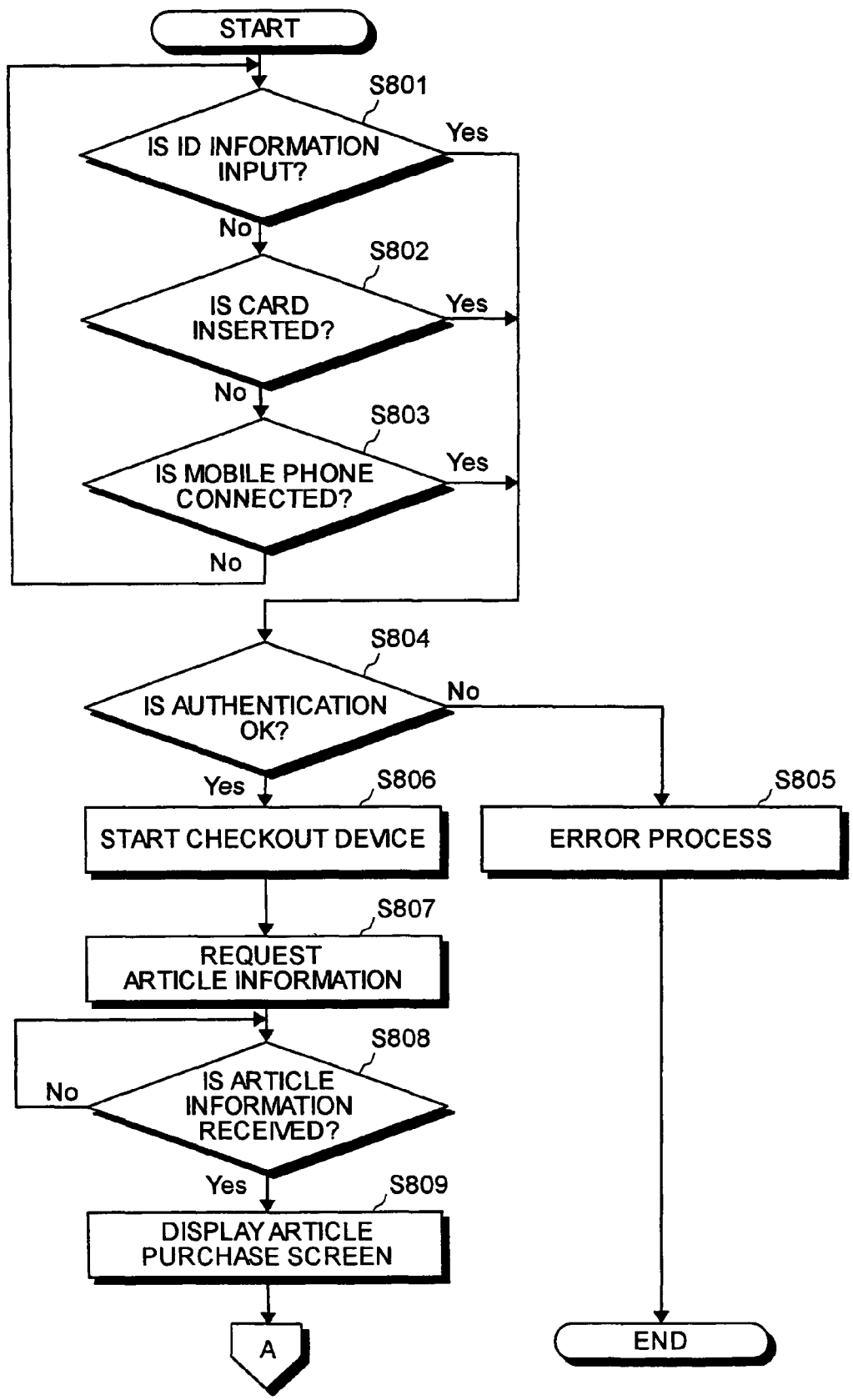
FIG. 8 is a flow chart of a process procedure performed by the checkout apparatus according to the embodiment of the invention.

Display contents displayed on the display screen 301 of the checkout apparatus according to the embodiment of the invention will be described below. FIG. 7 is an explanatory diagram of the display contents of the display screen 301 of the checkout apparatus according to the embodiment of the invention. In FIG. 7, when a "article purchase" tab 700 is selected, an article name display column 701, a unit price display column 702, a price display column 703, a purchasing quantity selection button 704, a purchasing determination ("YES") button 705, a purchasing cancel ("NO") button 706, a purchasing target list column 707, and a current total amount display column 708 are displayed.

In the article name display column 701, the name of an article the bar code of which is read by the bar-code reader 304 is displayed. In the unit price display column 702, the unit price of the article the bar code of which is similarly read by the bar-code reader 304 is displayed. As described above, different unit prices are displayed on the unit price display column 702 depending on customer IDs. The purchasing quantity selection button 704, the purchasing determination ("YES") button 705, and the purchasing cancel ("NO") button 706 are displayed on touch panels. When each of the display regions is touched with a finger or the like, it is determined that the corresponding button is depressed.

The purchasing quantity selection button 704 is used to select the number of articles when a plurality of articles each of which is the same as an article the bar code of which is read by the bar-code reader 304 are purchased at once. In this case, although the buttons corresponding to the numbers are arranged, in place of the plurality of buttons, the numbers may be designated by the ten key pad 306. When the number of articles to be purchased is selected (designated), a price calculated on the basis of a unit price and the number of articles to be purchased is displayed in the price display column 703.

The purchasing determination ("YES") button 705 is depressed to recognize that an article displayed in the article name display column 701 is purchased. On the other hand, the purchasing cancel ("NO") button 706 detects the depression to recognize that the article displayed in the article name display column 701 is not purchased. When it is recognized that the article is purchased, the articles is additionally displayed in the purchasing target list column 707, and a total amount displayed on the current total amount display column 708 is changed.

(Procedures of Checkout Apparatus)

Procedures of the checkout apparatus according to the embodiment of the invention will be described below. FIG. 8, FIG. 9, FIG. 14, FIG. 16, and FIG. 18 are flow charts of the procedures of the checkout apparatus according to the embodiment of invention. In the flow chart in FIG. 8, it is decided whether ID information is input by a customer or not (step S801), whether the card 350 is inserted into the card slot 302 of the checkout apparatus 101 or not (step S802), or whether the mobile phone 351 is connected to the mobile phone connection port 303 or not (step S803).

When all the conditions are No (step S801: No, step S802: No, and step S803: No), the checkout apparatus 101 waits until any one of the conditions is Yes. When any one of conditions is Yes (step S801: Yes, step S802: Yes, or step S803: Yes), an authentication process is performed on the basis of the customer ID information acquired in any one of steps S801 to S803 (step S804).

The authentication process may be determined on the basis of information related to a validated date included in the customer ID information, or the customer ID information is temporarily transmitted to the store server 104 to cause the store server 104 to perform an authentication process, and a result of the authentication process may be received. In step S804, as a result of the determination, when the authentication is not good (step S804: No), an error process (including an error display process on the display screen 301) is performed (step S805), and the procedure is ended.

On the other hand, in step S804, when the authentication is OK (step S804: Yes), a start process of the checkout apparatus is performed (step S806), and the latest article information is requested from the store server 104 (step S807). The checkout apparatus waits until the article information is received from the store server 104 (step S808): When the article information is received (step S808: Yes), an article purchasing screen shown in FIG. 7 is displayed on the display screen 301 (step S809). In this manner, the checkout apparatus 101 becomes usable.

Figure 9:
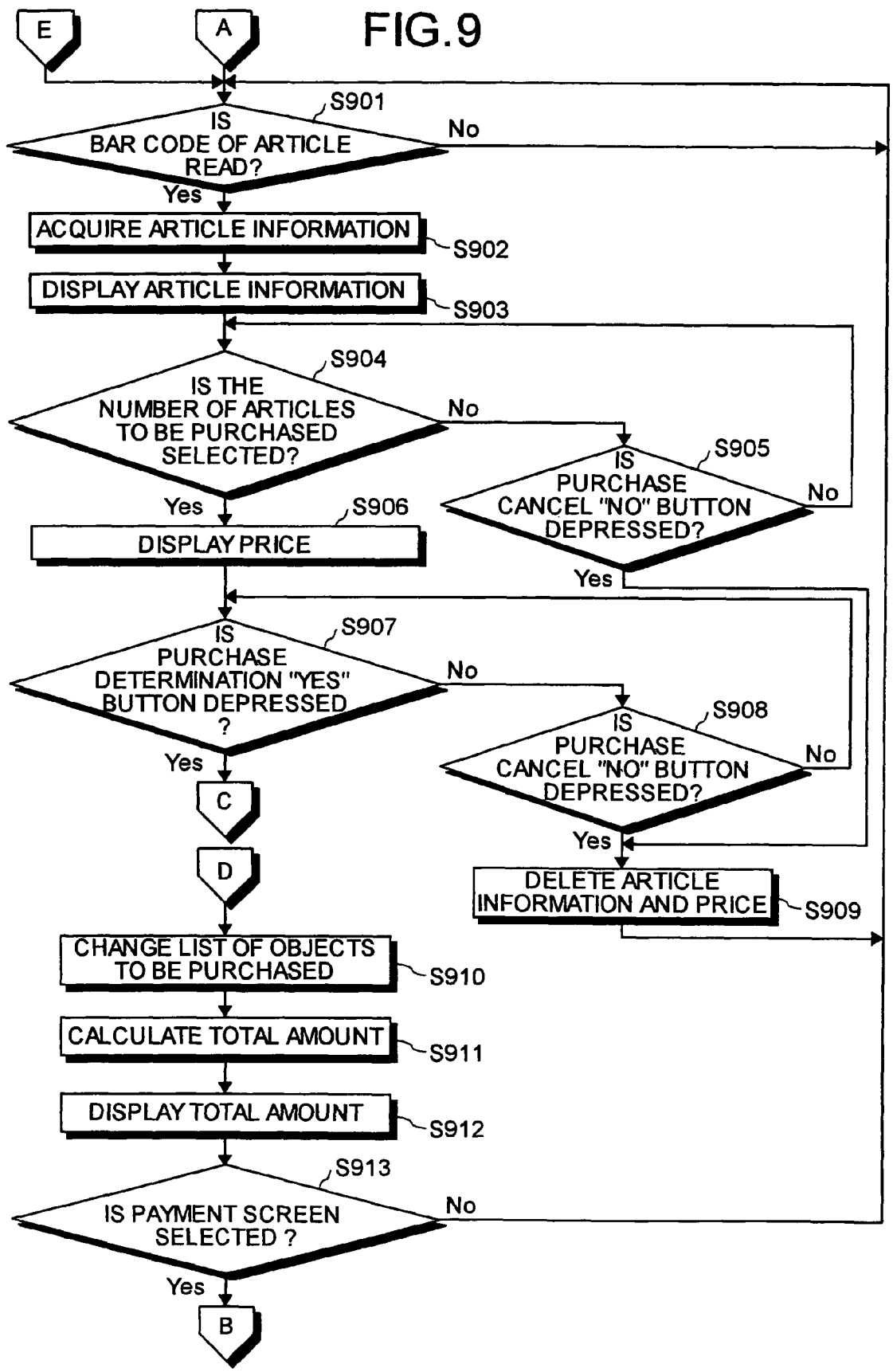
FIG. 9 is a flow chart of other process procedure performed by the checkout apparatus according to the embodiment of the invention.

In the flow chart shown in FIG. 9, it is decided whether a bar code added to an article to be purchased is read by the bar-code reader 304 or not (step S901). In this case, the checkout apparatus waits until the bar code is read, and, when the bar code is read (step S901: Yes), the checkout apparatus acquires (extracts) article information corresponding to the read bar code (step S902). The article information is acquired from the article information storage section 506. The article information may be acquired from a database including the store server 104 connected to the network 100 through the wireless control section 407 shown in FIG. 4.

Figure 10:
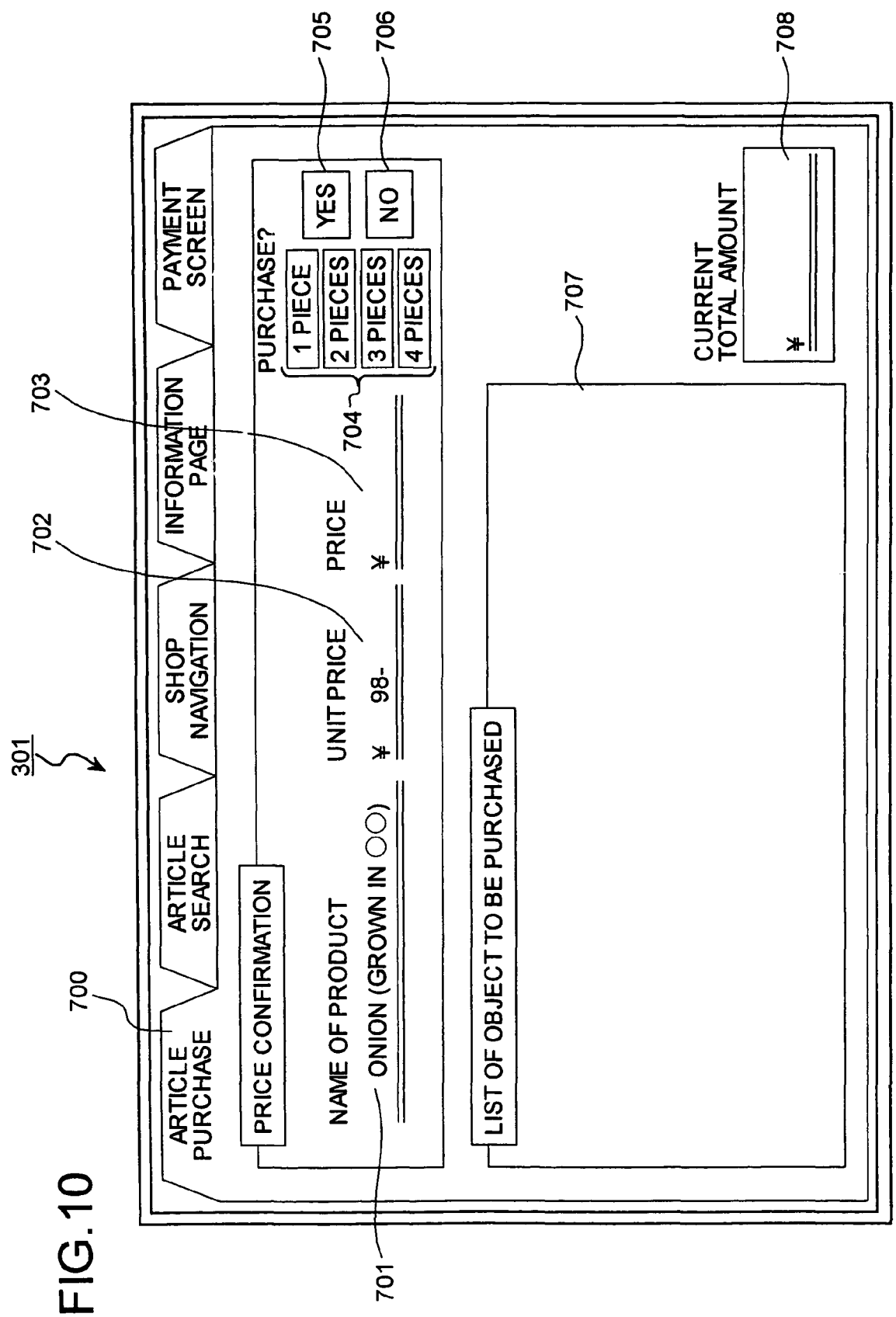
FIG. 10 is an explanatory diagram of other display contents of the display screen of the checkout apparatus according to the embodiment of the invention.

For example, the acquired article information is displayed on the display screen 301 as shown in FIG. 10 (step S903). It is decided whether the number of articles to be purchased is selected (designated) or not, i.e., whether any one of the purchasing quantity selection buttons 704 is depressed or not (step S904). In this case, when the number of articles to be purchased is not selected (designated) (step S904: No), it is decided whether the purchasing cancel button 706 is depressed or not (step S905). When the purchasing cancel button 706 is depressed (step S905: Yes), the control flow shifts to step S909. On the other hand, when the purchasing cancel button 706 is not depressed in step S905 (step S905: No), the control flow returns to step S904.

Figure 11:
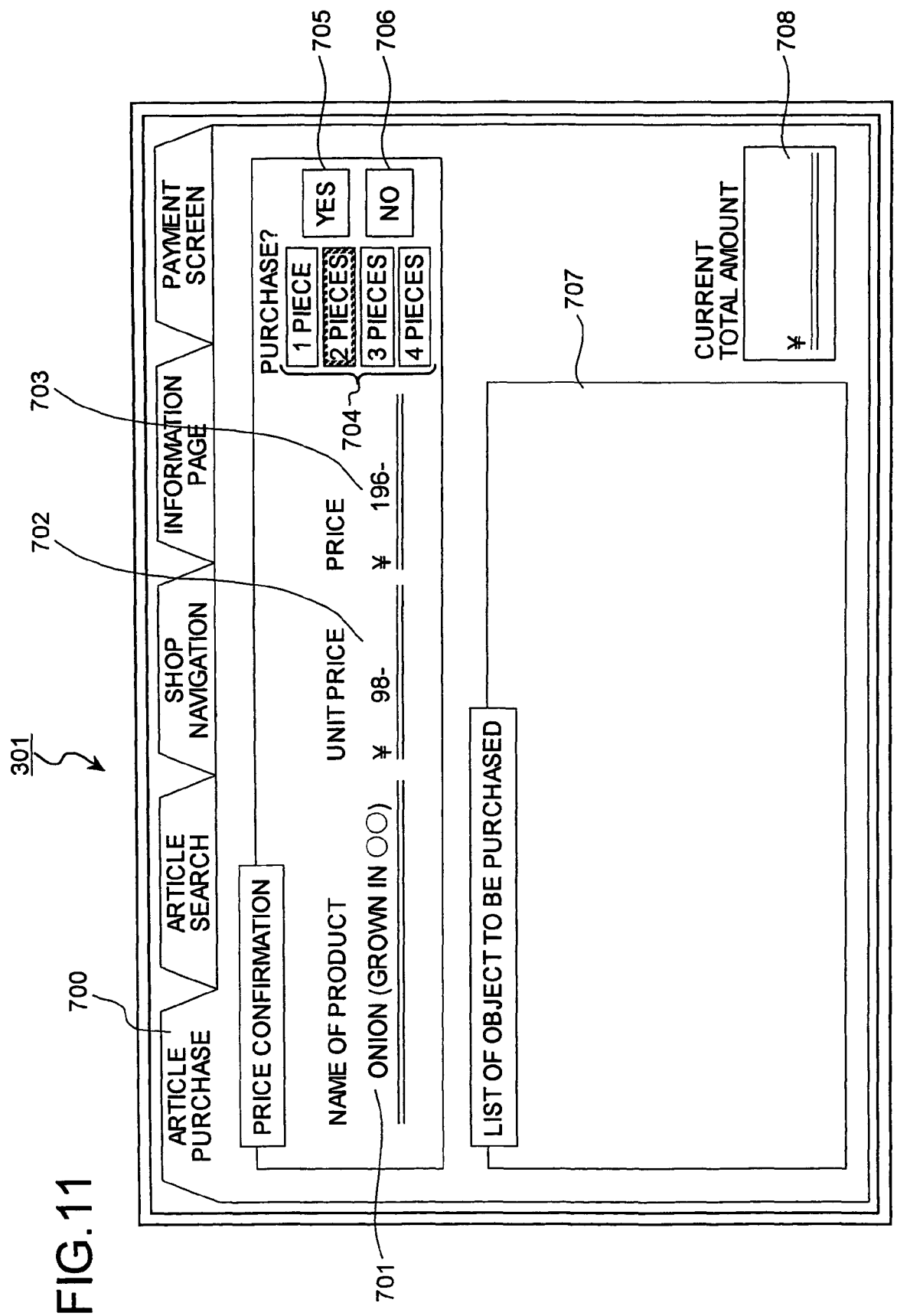
FIG. 11 is an explanatory diagram of still other display contents of the display screen of the checkout apparatus according to the embodiment of the invention.

In step S904, when the number of articles to be purchased is selected (designated) (step S904: Yes), the price of an article is calculated on the basis of the unit price of the article and the number of articles to be purchased. As shown in FIG. 11, the price is displayed (step S906). It is decided whether the purchasing determination button 705 is depressed or not (step S907). When the purchasing determination ("YES") button 705 is not depressed (step S907: No), it is decided whether the purchasing cancel button 706 is depressed or not (step S908). When the purchasing cancel button 706 is depressed (step S908: Yes), the control flow shifts to step S909. When the control flow shifts to step S909, the names, unit prices, and prices of articles displayed on the display screen 301 are displayed, all the prices are deleted (step S909), and the control flow returns to step S901.

Figure 12:
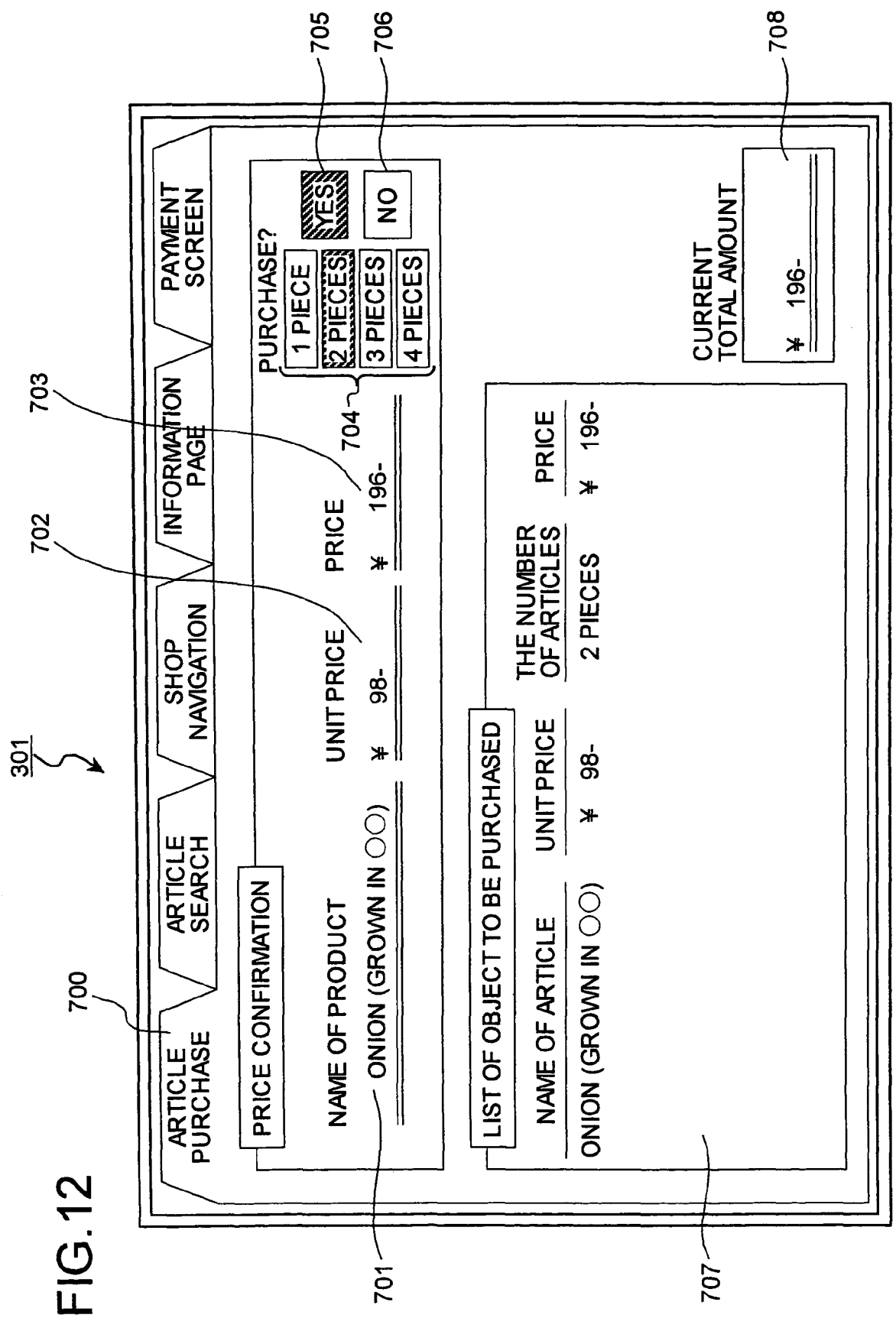
FIG. 12 is an explanatory diagram of still other display contents of the display screen of the checkout apparatus according to the embodiment of the invention.

On the other hand, when the purchasing cancel button 706 is not depressed in step S908 (step S908: No), the control flow returns to step S907. When the purchasing determination button 705 is depressed in step S907 (step S907: Yes), the contents of the purchasing target list column 707 of the display screen 301 are changed (updated) as shown in FIG. 12 (step S910). FIG. 12 shows that an "onion" is newly added to the purchasing target list column 707 of the display screen 301 shown in FIG. 10.

Figure 13:
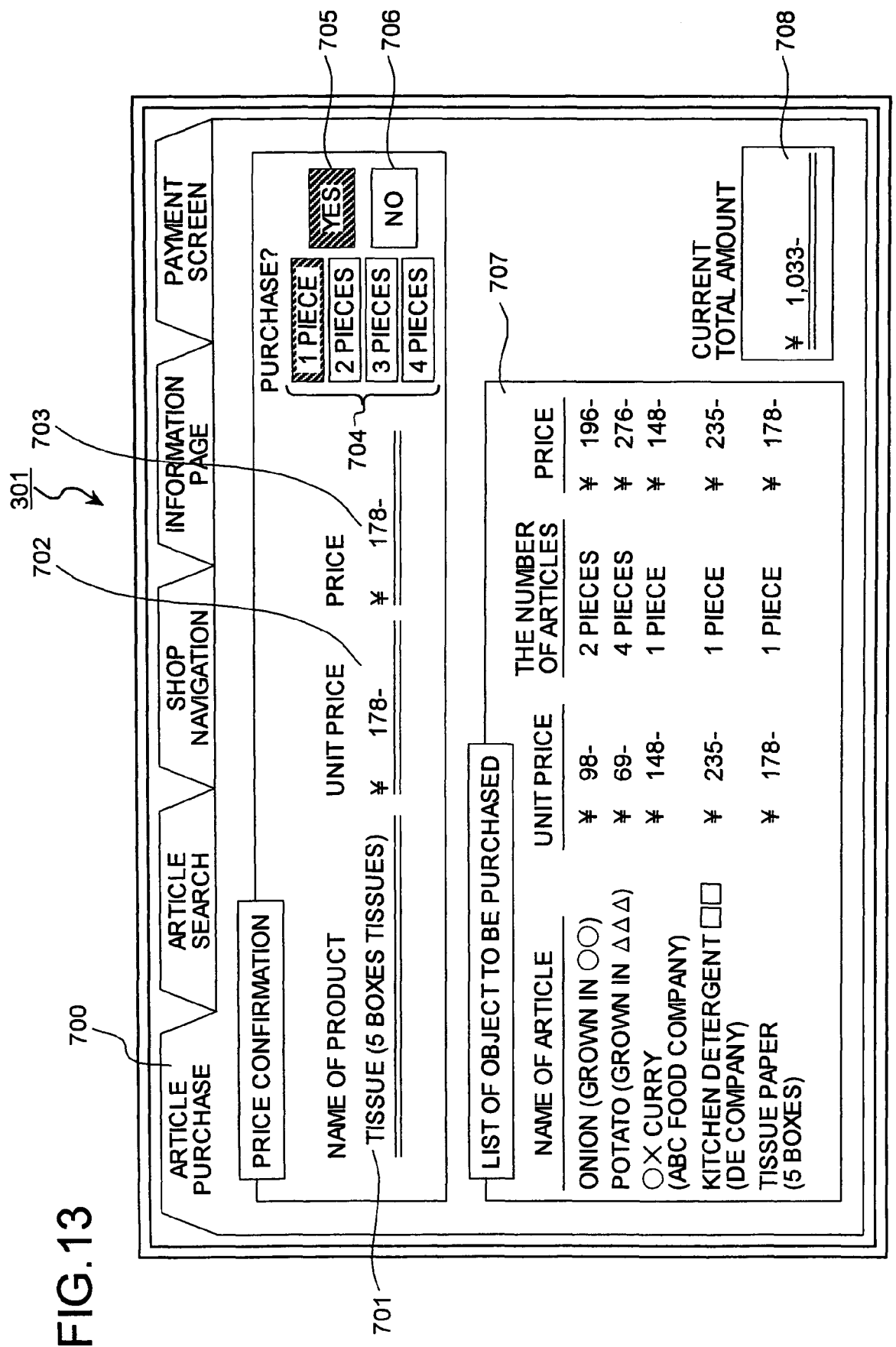
FIG. 13 is an explanatory diagram of still other display contents of the display screen of the checkout apparatus according to the embodiment of the invention.

A total amount of prices is calculated (step S911), and the total amount is displayed as shown in the total amount display column 708 of the display screen 301 in FIG. 12 (step S912). Until a payment screen is selected (designated) (step S913: Yes), the processes in steps S901 to S913 are repeated. FIG. 13 shows a state in which a plurality of articles are read and displayed on the purchasing target list column 707. Although sales taxes are not described in FIGS. 12 and 13, other information related to the sales taxes may be displayed on the purchasing target list together with an article name, a unit price, and a price.

Figure 14:
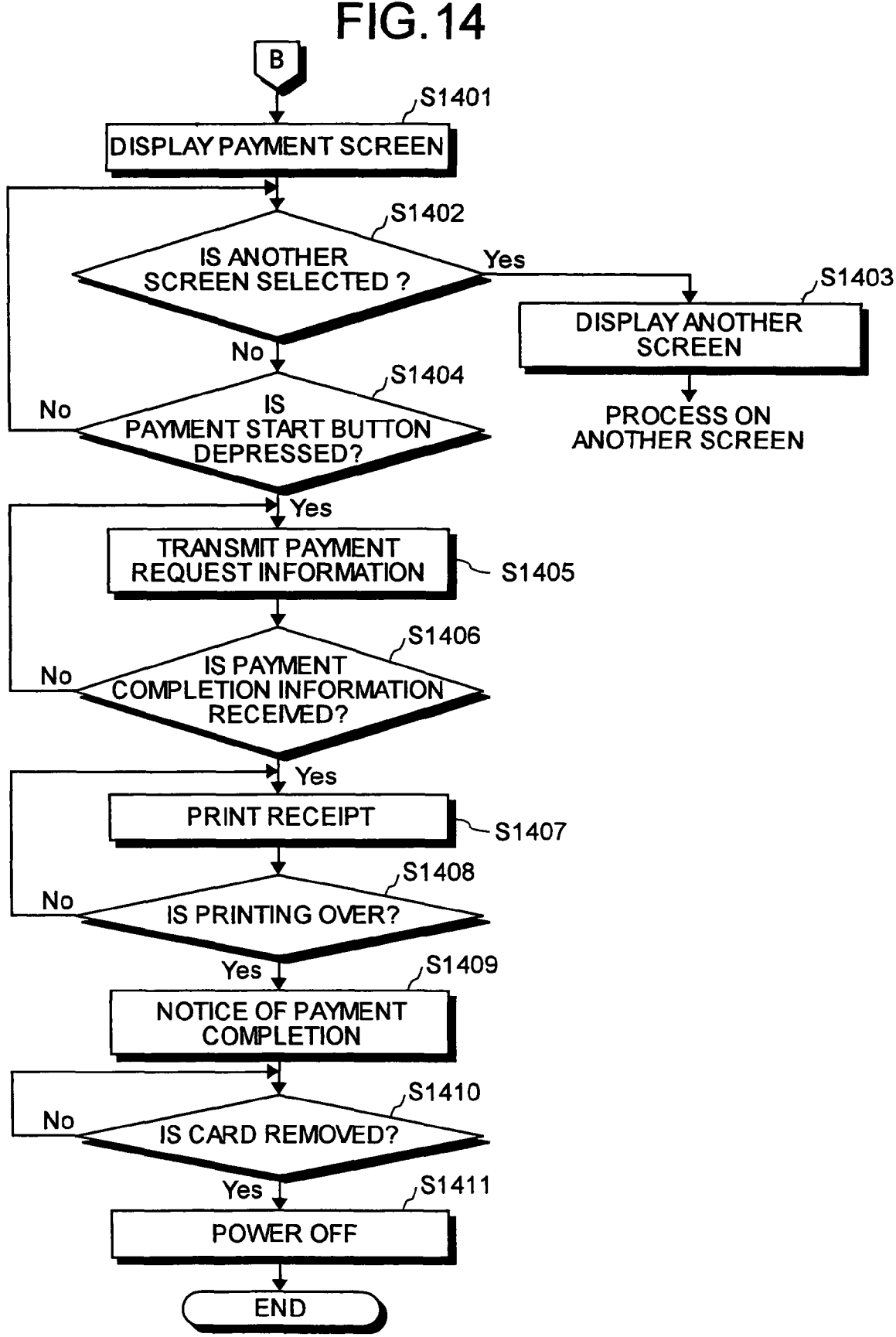
FIG. 14 is a flow chart of still other process procedure performed by the checkout apparatus according to the embodiment of the invention.
Figure 15:
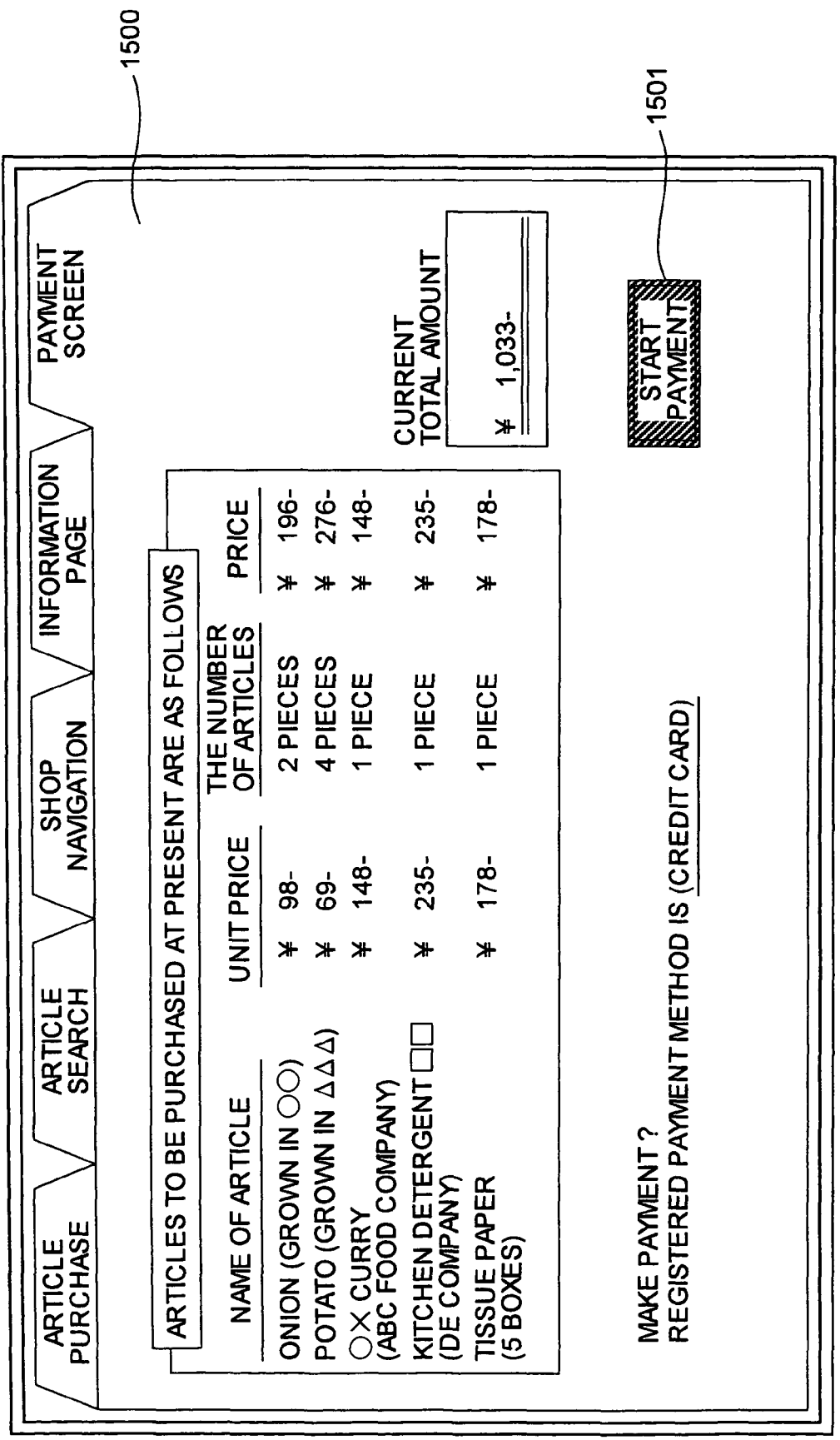
FIG. 15 is an explanatory diagram of still other display contents of the display screen of the checkout apparatus according to the embodiment of the invention.

In the flow chart in FIG. 14, when the payment screen is selected (designated), for example, a payment screen shown in FIG. 15 is displayed (step S1401). The payment screen can be easily selected (designated) such that a "payment screen" tag 1500 is touched with a finger or the like.

It is decided whether another screen (for example, "article search" "shop navigation", "information page", or the like) is selected or not (step S1402). When the other screen is selected (designated) (step S1402: Yes), the selected (designated) other screen is displayed (step S1403), and a process on the other screen is performed.

On other hand, in step S1402, when the other screen is not selected (designated) (step S1402: No), it is decided whether a "payment start" button 1501 shown in FIG. 15 is depressed or not (step S1404). In this case, the checkout apparatus waits until the "payment start" button 1501 is depressed, and, when the "payment start" button 1501 is depressed (step S1404: Yes), payment request information is transmitted to the store server 104 (step S1405). The payment request information includes at least customer ID information and information related to a total amount.

Thereafter, it is decided whether payment completion information is received from the store server 104 or not (step S1406). When the payment completion information is received (step S1406: Yes), a receipt is printed on the basis of the received payment completion information (step S1407). The checkout apparatus waits until the printing operation of the receipt is completed, and, when the printing operation is completed (step S1408: Yes), a payment completion notification screen (not shown) is displayed on the display screen 301 (step S1409). On the payment completion notification screen, contents, e.g., "Payment is completed. Please remove the card from the card slot. Thank you very much" are displayed on the display screen 301, so that a customer is notified that the payment is completed and that the card 350 or the mobile phone 351 is removed.

It is decided whether the card 350 is removed or not (step S1410). When the card 350 is removed (step S1401: Yes), the power supply of the checkout device 101 is turned off (or set in a power-saving mode) (step S1411, and the series of processes are ended.

Figure 16:
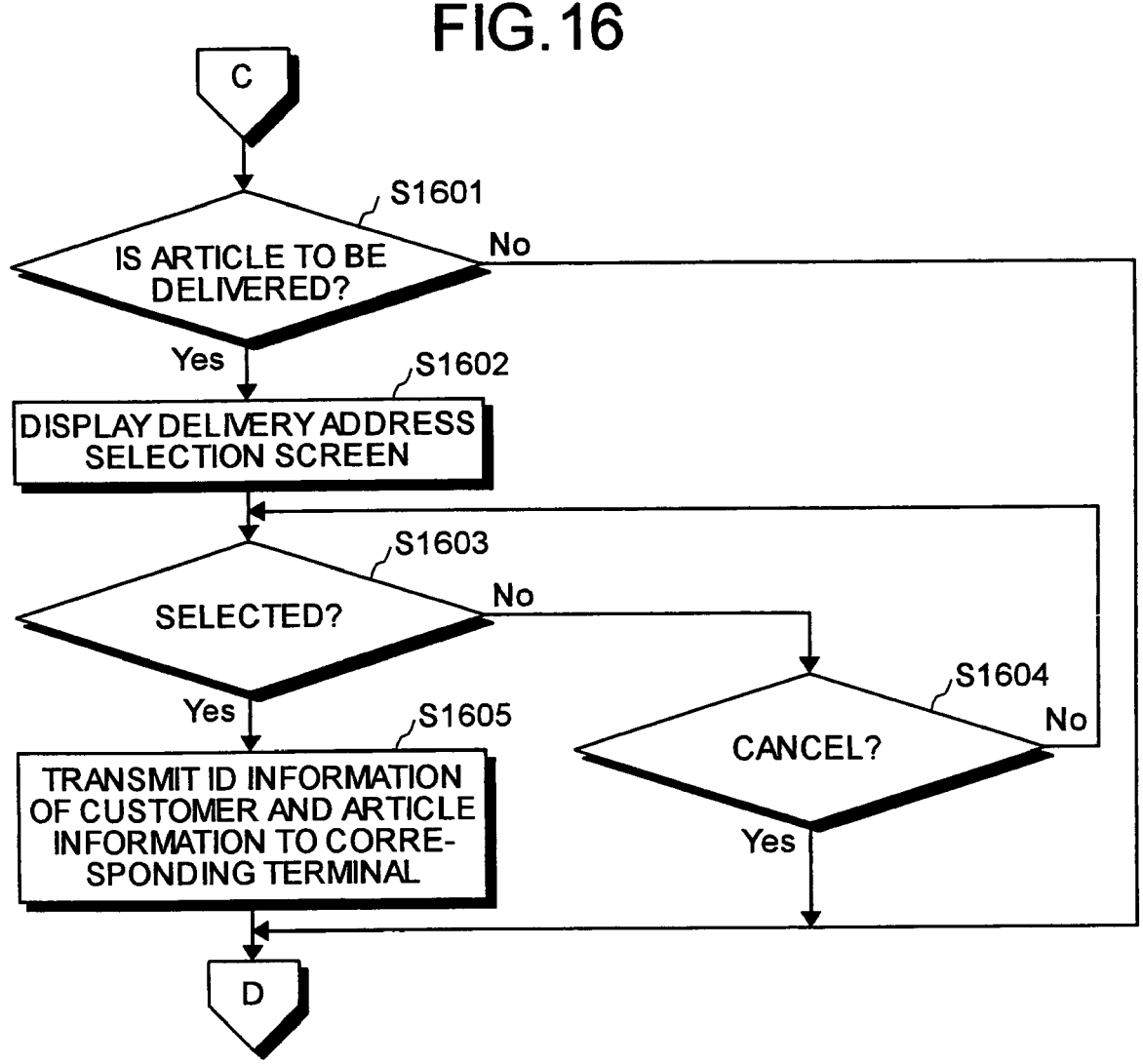
FIG. 16 is a flow chart of still other process procedure performed by the checkout apparatus according to the embodiment of the invention.

A procedure of the checkout apparatus performed when there is an object to be delivered will be described below. FIG. 16 is a flow chart of a procedure of other processes of the checkout apparatus according to the embodiment of the invention will be described below. In step S907 in the flow chart in FIG. 9, a purchasing determination button is depressed (step S907: Yes). In this case, when the purchasing determination button is depressed (step S907: Yes), in step S1601 shown in FIG. 16, it is decided whether an article which is determined to be purchased is an article to be delivered or not. The article to be delivered is an heavy weight article (e.g., one case of beer) or an article (tissue paper or toilet paper) which is not used immediately after the article is purchased.

Figure 17:
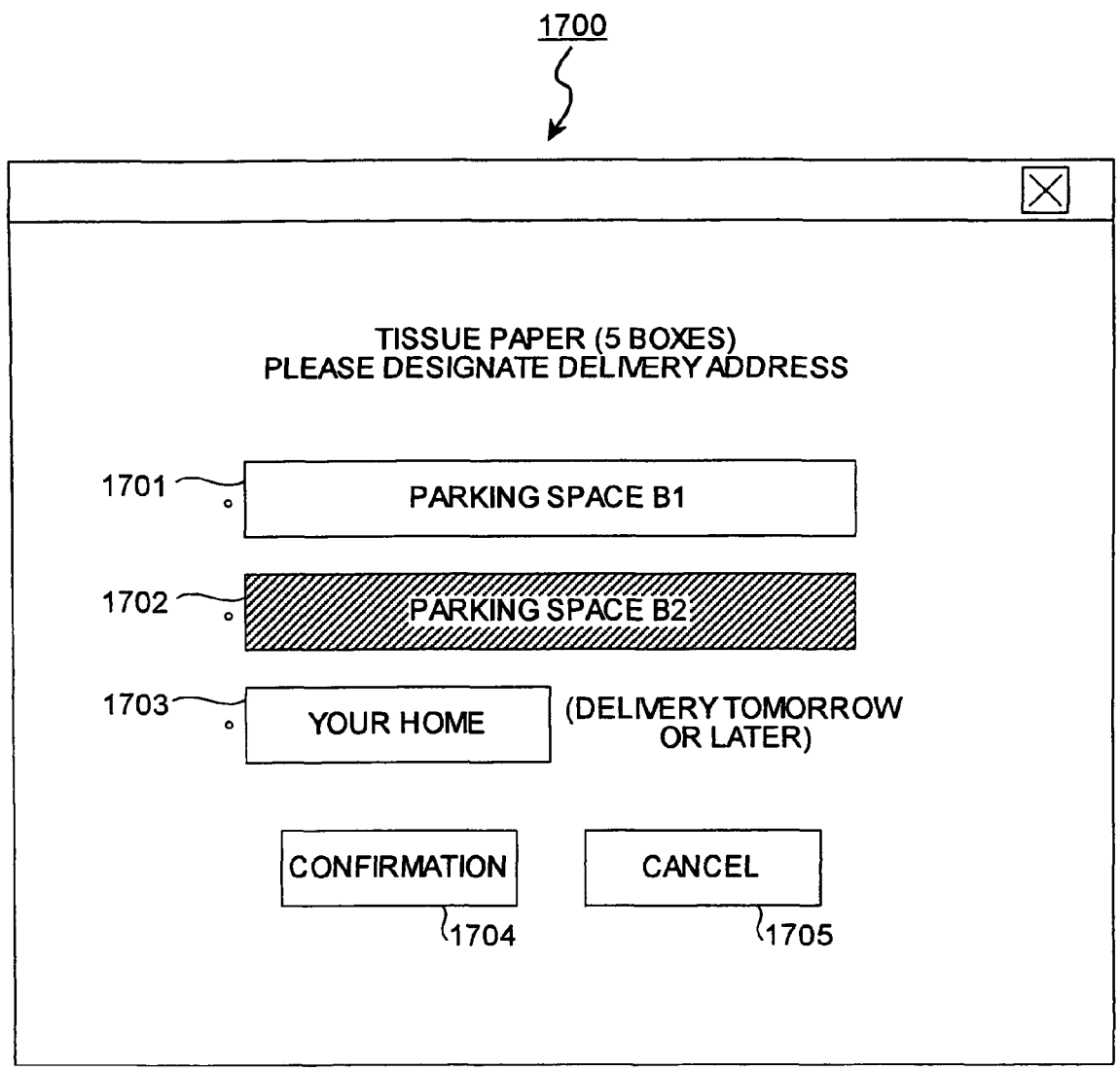
FIG. 17 is an explanatory diagram of still other display contents of the display screen of the checkout apparatus according to the embodiment of the invention.

When the article is not the article to be delivered in step S1601 (step S1601: No), the control flow shifts to step S910 shown in FIG. 9 without performing any process. On the other hand, when the article is the article to be delivered (step S1601: Yes), for example, a delivery address selection screen 1700 shown in FIG. 17 is displayed (step S1602). FIG. 17 is an explanatory diagram of a delivery address selection screen. In FIG. 17, display columns 1701 to 1703 showing information related to a delivery address, a "confirmation" button 1704, and a "cancel" button 1705 are displayed.

It is decided whether the delivery address is selected or not (step S1603 or whether the delivery address is canceled or not (step S1604). The selection of a delivery address can be recognized by touching a delivery address desired by the customer with a finger in the display columns 1701 to 1703 in FIG. 17 and checking whether the "confirmation" button 1704 is depressed or not. The selection of the delivery address can be recognized by checking whether the selection is canceled or not, i.e., whether the "cancel" button 1705 is depressed or not. When the selection is canceled (step S1604: Yes), the control flow shifts to step S910 shown in FIG. 9.

On the other hand, the delivery address is selected (step S1603: Yes), customer ID information and article information of an article to be delivered are transmitted to a corresponding terminal device (step S1605). Thereafter, the control flow shift to step S910 shown in FIG. 9. In this case, for example, when the delivery address is a parking space, the terminal device is the article handover-location terminal device 105. When the delivery address is customer's home, the terminal device is the article delivery-center terminal device 106. In the article delivery-center terminal device 106, a corresponding destination address which is registered in advance is extracted from the received customer information to arrange delivery.

Figure 18:
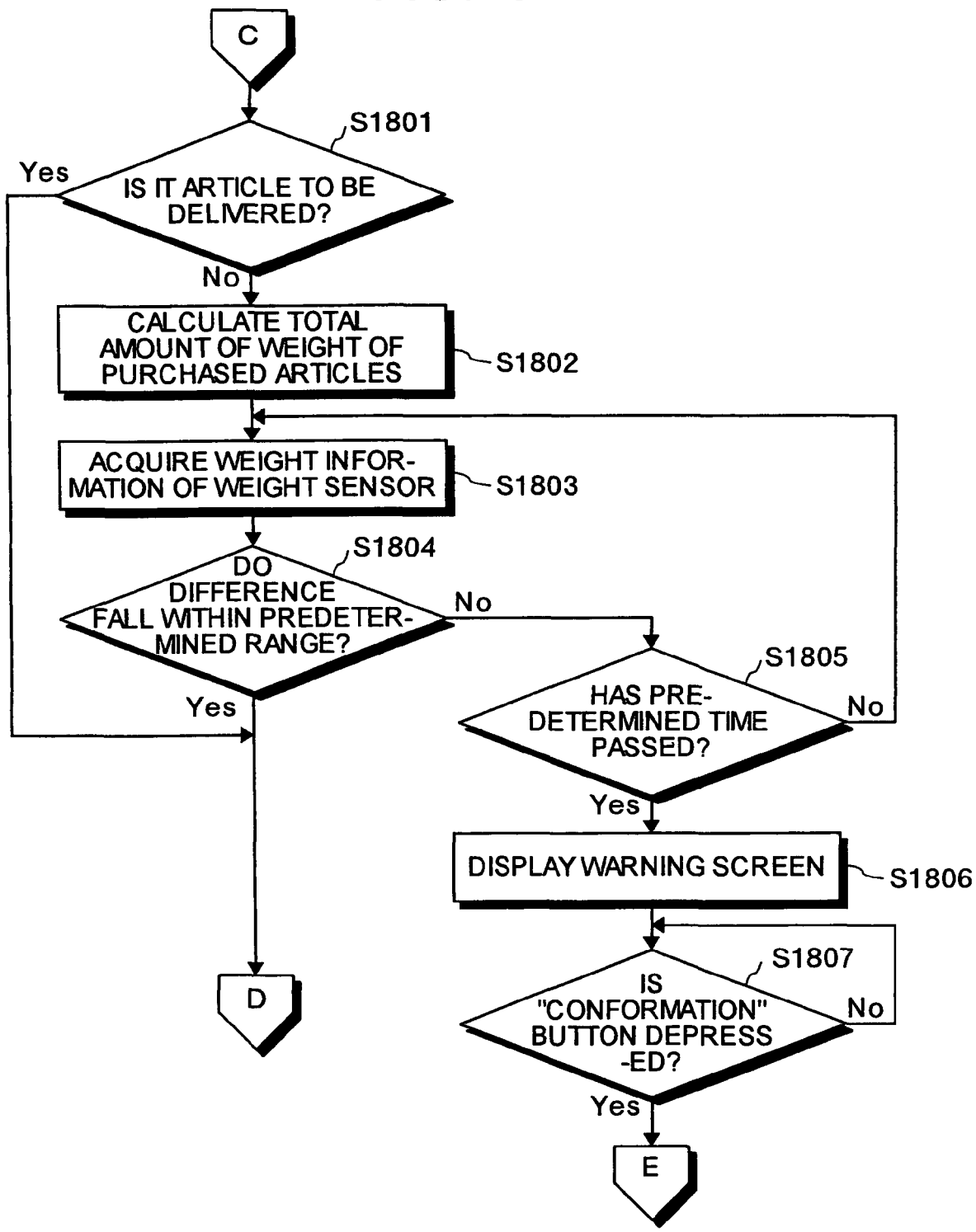
FIG. 18 is a flow chart of still other process procedure performed by the checkout apparatus according to the embodiment of the invention.

A procedure of the checkout apparatus related to prevention of checkout mistakes, illegal acts, or the like will be described below. FIG. 18 is a flow chart of a procedure of other processes of the checkout apparatus according to the embodiment of the invention. In step S907 in the flow chart in FIG. 9, when a purchasing determination button is depressed (step S907: Yes), it is decided in step S1801 shown in FIG. 18 whether the article determined to be purchased is an article to be delivered. When the article is an article to be delivered (step S1801: Yes), the control flow shifts to step S910 shown in FIG. 9 without any process.

On the other hand, when the article is not an article to be delivered in step S1801 (step S1801: No), the article is naturally put in the basket unit 200 of the shopping cart 102, and the total weight of the articles in the basket unit 200 changes. When this change in weight is used, it can be decided whether the checkout process is normally performed or not.

A total weight of articles the bar codes of which are read by the bar-code reader 304 is calculated (step S1802). The calculation of the total weight can be performed such that information related to a weight is extracted from the database shown in FIG. 6 to perform an arithmetic operation on the basis of the information. Weight information measured by the weight sensor 201 is acquired (step S1803).

Thereafter, the total weight of articles calculated in step S1802 is compared with the weight information acquired in step S1803, and it is decided whether the difference falls within a predetermined range or not (step S1804). In this case, when the difference falls within the predetermined range (step S1804: Yes), it is determined that the checkout process is correctly performed, and the control flow shifts to step S910 shown in FIG. 9 without performing any process.

On the other hand, when the difference is larger than a value falling within the predetermined range (step S1804: No), the checkout apparatus waits for a predetermined period of time. It is decided whether the predetermined period of time has elapsed (step S1805). The predetermined period of time can be determined in consideration of time required when the article is put in the basket unit 200 of the shopping cart 102 after the checkout process (read operation for the bar code of the article) is performed. When the predetermined period of time has not elapsed (step S1805: No), the control flow returns to step S1803, and the weight information is acquired from the weight sensor 201 again.

In this manner, the processes in steps S1803 to S1805 are repeated. When the predetermined period of time has elapsed while the difference is larger than the value falling within the predetermined range in step S1805 (step S1805: Yes), a warning screen 1900 shown in FIG. 19 is displayed (step S1806) to call attention to a customer. Thereafter, the checkout apparatus waits until a "confirmation" button 1901 shown in FIG. 19 is depressed, and, when the "confirmation" button 1901 is depressed (step S1807: Yes), the control flow shifts to step S901 shown in FIG. 9 to cause the checkout process again.

(Contents of Illegal Act Prevention Function)

Figure 20:
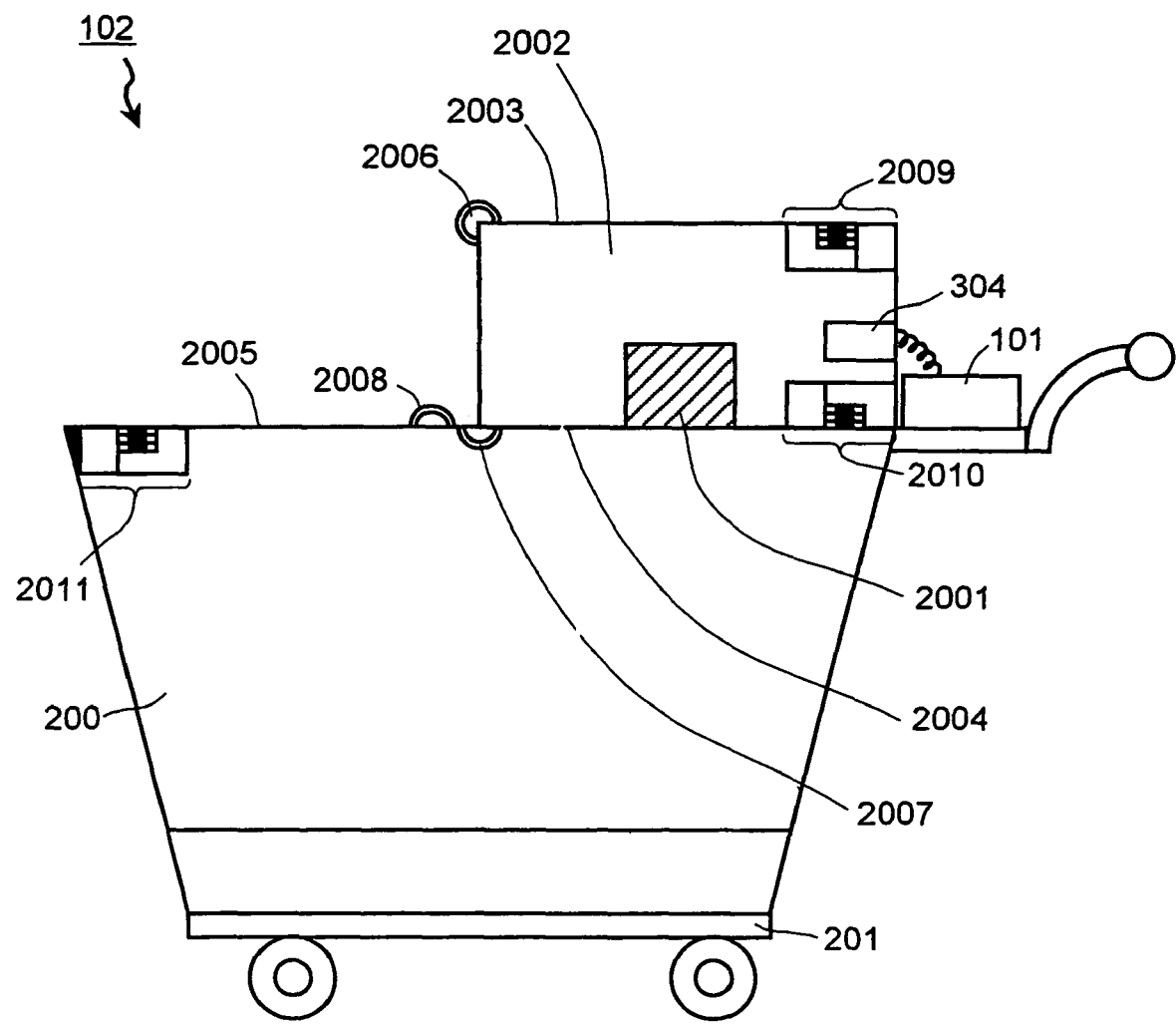
FIG. 20 is an explanatory diagram of the appearance of a shopping cart according to the embodiment of the invention.

The appearance of another shopping cart according to the embodiment of the invention will be described below. FIG. 20 is an explanatory diagram of the appearance of the shopping cart according to the embodiment of the invention. In FIG. 20, the shopping cart 102 comprises an article insertion box 2002 attached on the upper side of the basket unit 200.

On the article insertion box 2002, an article insertion lid 2003 (hereinafter, "first lid") is arranged on the upper side, and an article convey lid 2004 (hereinafter, "second lid") for conveying an article 2001 to the basket unit 200. On the upper side of the basket unit 200, a part where the article insertion box 2002 is not arranged comprises an article removal lid (hereinafter, "third lid") 2005.

Figure 21:
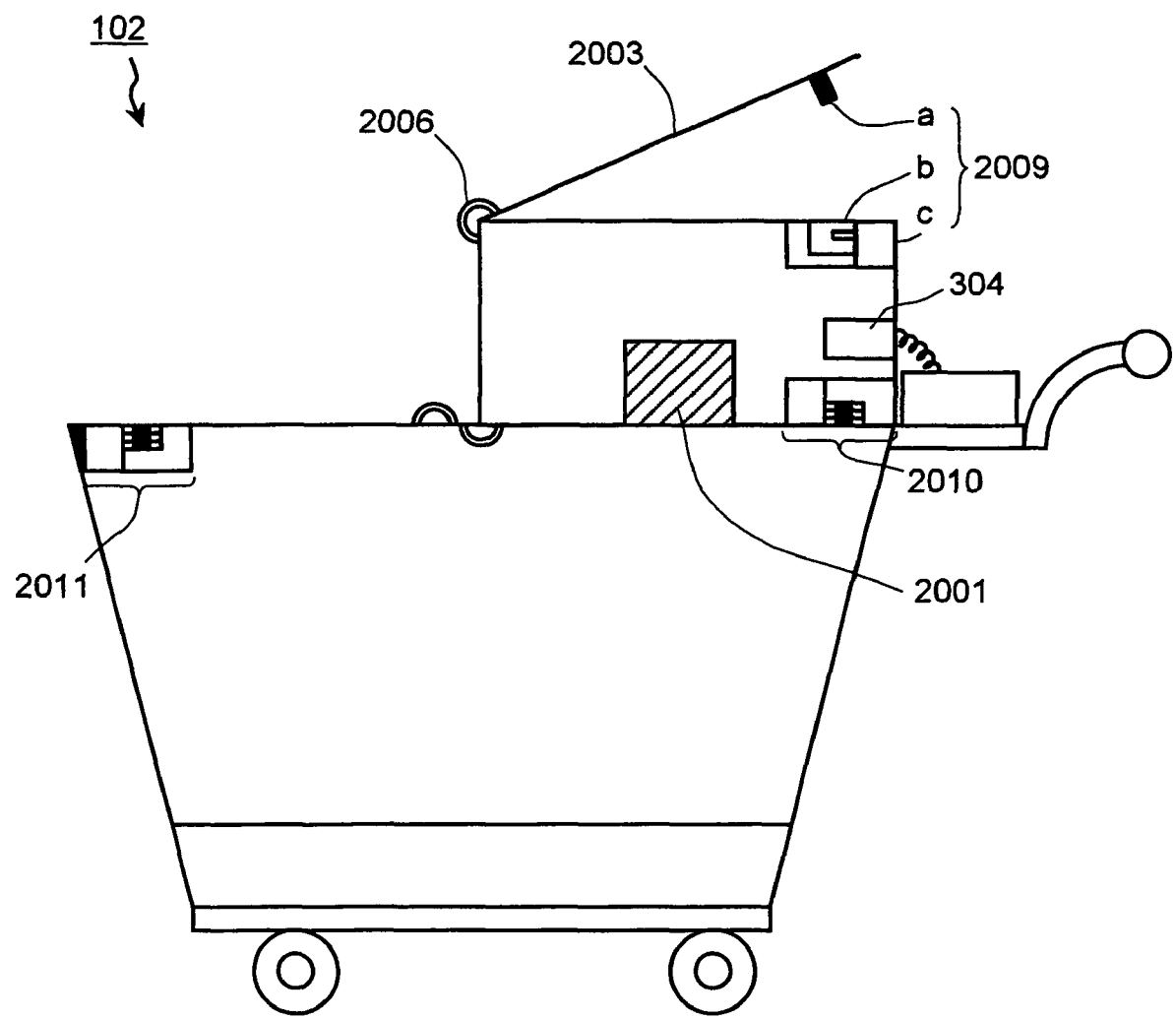
FIG. 21 is an explanatory diagram of an example of the operation of the shopping cart shown in FIG. 20.
Figure 22:
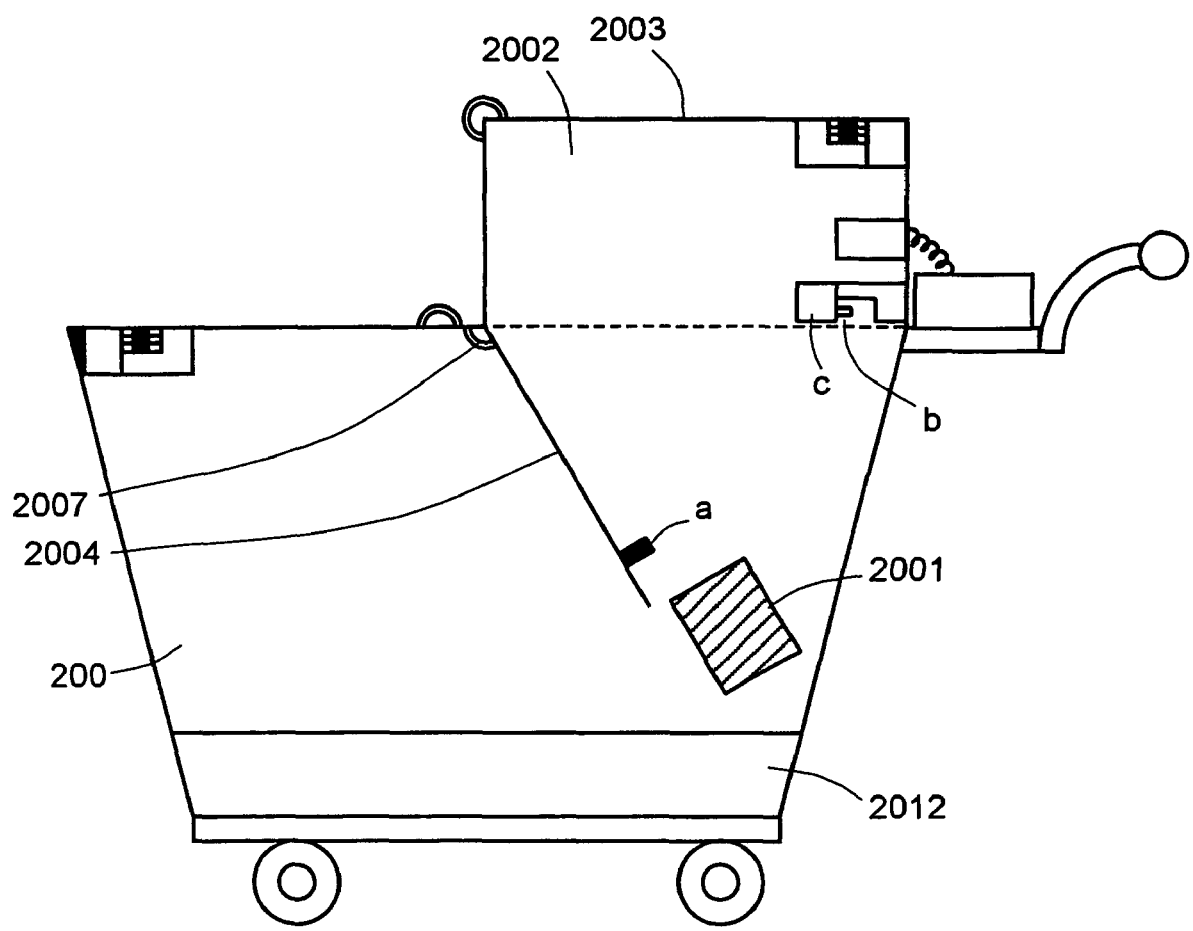
FIG. 22 is an explanatory diagram of another example of the operation of the shopping cart shown in FIG. 20.
Figure 23:
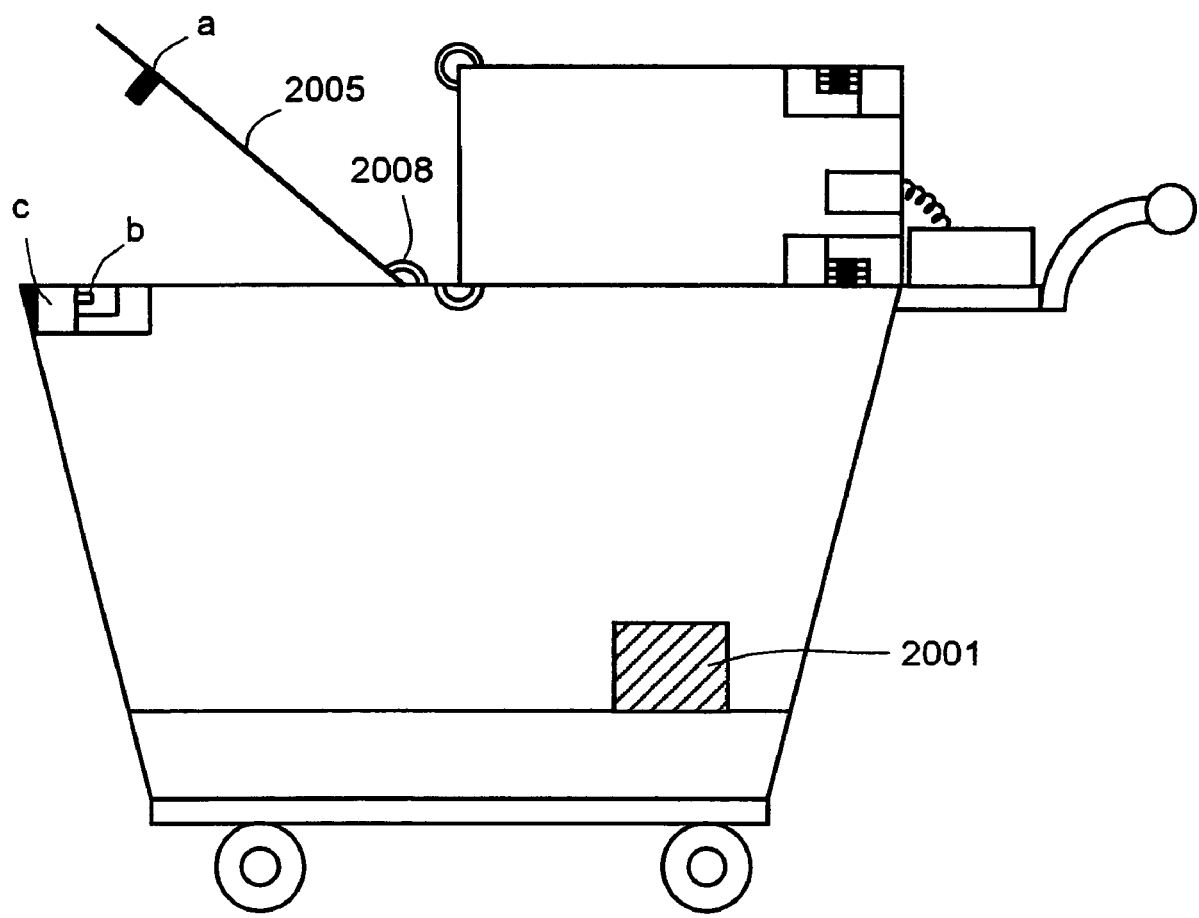
FIG. 23 is an explanatory diagram of still another example of the operation of the shopping cart shown in FIG. 20.

The first lid 2003, as shown in FIG. 21, opens upward about a first hinge 2006. The second lid 2004, as shown in FIG. 22, opens downward about a second hinge 2007. The third lid 2005, as shown in FIG. 23, opens upward about a third hinge 2008.

Lid locking mechanisms (a first lid locking mechanism 2009, a second lid locking mechanism 2010, and a third lid locking mechanism 2011) are arranged on the lids, respectively, to regulate the opening operations of the lids. Each lid locking mechanism is constituted by a hook a, a cylinder b engaged with the hook a, and a cylinder controller c for controlling the action of the cylinder b. The cylinder b is engaged with the hook a to set the lid locking mechanism in a "LOCK" state. The cylinder b is disengaged from the hook a to set the lid locking mechanism in an "OPEN" state.

In addition, on all or some of the lids (for example, only the second lid or only second and third lids), a drive device (not shown) which automatically opens/closes a lid may be arranged. Drive devices may be arranged for the lids, respectively, or one drive device may be shared by the lids. The drive device is constituted by a motor and various gears for transmitting the rotating force of the motor. A current is flowed into the motor to rotate the motor, and the lid opens about the corresponding hinge with the rotating force of the motor. A current having an opposite direction is flowed in the motor to reversely rotate the motor, and the lid closes about the corresponding hinge with the reverse rotating force.

A cushion member 2012 which absorbs shock occurring when the article 2001 falls into the basket unit 200 by an opening operation of the second lid 2004 is arranged on the bottom surface of the basket unit 200.

FIG. 21 shows a state in which the first lid 2003 is opened to cause the article 2001 to put in the article insertion box 2002. FIG. 22 shows a state in which the second lid 2004 is opened to cause the article 2001 to fall from the article insertion box 2002 to the basket unit 200. FIG. 23 shows a state in which, after payment is completed, the third lid 2005 is opened to make it possible to remove the article 2001 in the basket unit 200.

(Procedure of Lid Opening/Closing Control Section)

Figure 24:
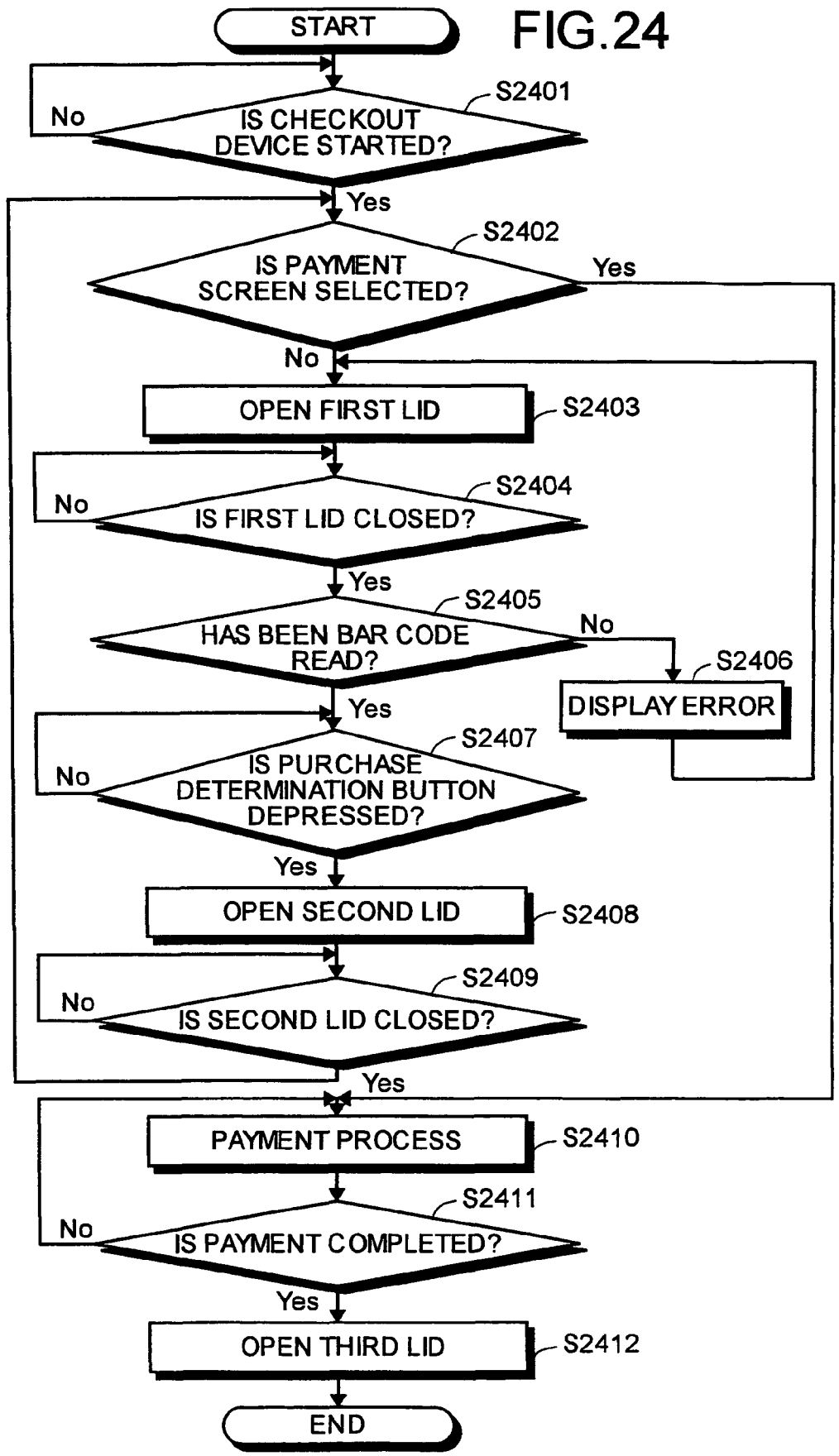
FIG. 24 is a flow chart of a process procedure for a lid opening/closing section of the shopping cart according to the embodiment of the invention.

A procedure of a lid opening/closing control section shown in FIG. 5 will be described below. FIG. 24 is a flow chart of a procedure of a lid opening/closing section of the shopping cart according to the embodiment of the invention. In the flow chart in FIG. 24, the lid opening/closing control section waits until the checkout apparatus is started (step S2401), and, when the checkout apparatus is started (step S2401: Yes), it is decided whether a payment screen of the checkout device 101 is selected (designated) or not (step S2402). In this case, when the payment screen is not selected (designated) (step S2402: No), the first lid locking mechanism 2009 of the first lid 2003 is set in an "OPEN" state, and the first lid 2003 becomes openable/closable (step S2403).

In this case, an operator puts the article 2001 in the article insertion box 2002 while the first lid 2003 is open and causes the bar-code reader to read the bar code of the article 2001. FIG. 21 shows this state. The lid opening/closing control unit waits until the first lid 2003 is closed (step S2404), and, when the first lid 2003 is closed (step S2404: Yes), the first lid is locked, and it is decided whether the bar code of the article 2001 has been read or not (step S2405).

When the bar code has not been read in step S2405 (step S2405: No), an error display is performed by the checkout device 101 (step S2406) to urge the operator to read the bar code according to the error display. thereafter, the control flow returns to step S2403).

In step S2405, when the bar code of the article 2001 has been read (2405: Yes), it is decided whether the purchasing determination button 705 is depressed for the article 2001 or not (step S2407). When the purchasing determination button 705 is depressed (step S2407: Yes), the second lid 2004 opens (step S2408). In this manner, the article 2001 is stored in the basket unit 200.

Thereafter, the lid opening/closing control section waits until the second lid 2004 is closed (step S2409), and, when the second lid 2004 is closed (step S2409: Yes), the control flow returns to step S2402. When a payment screen is selected (designated) in step S2402 (step S2402: Yes), a payment process is performed (step S2410). Thereafter, the lid opening/closing control section waits until the payment is completed (step 2411). When the payment process is completed (step S2411: Yes), the third lid 2005 is opened (step S2412). In this manner, the operator can extract the article 2001 in the article insertion box 2002.

(Operation Contents of Lid Locking Mechanism)

FIG. 25 is an explanatory diagram of the operation contents of a lid locking mechanism of the shopping cart according to the embodiment of the invention. FIG. 25 shows the states "LOCK" and "OPEN" of the lid locking mechanisms of the lids at timings (t1 to t11). Until the checkout device 101 is started, all the lids are set in "LOCK" states. At a timing (t1) at which the checkout device 101 is started, the state of the first lid locking mechanism 2009 of the first lid 2003 changes from the "LOCK" state to the "OPEN" state.

An operator performs an opening operation for the first lid 2003 (t2). This opening operation need not be performed by the operator, and the first lid 2003 may be automatically opened by a drive device (not shown). The operator inserts the article 2001 in the article insertion box 2002 while the first lid 2003 is open (t3), and a read operation of the bar code of the article 2001 (t4). Thereafter, a closing operation for the first lid 2003 is performed.

The first lid 2003 is set in a closed state (t5). It can be checked by a lid opening/closing sensor (not shown) or the like whether the first lid 2003 is set in a closed state or not. At the timing (t5), the state of the lid locking mechanism of the first lid 2003 is changed from the state "OPEN" to the state "LOCK", and the state of the lid locking mechanism 2010 of the second lid 2004 is changed from the state "LOCK" to the state "OPEN". With this operation, the operator is regulated such that the article 2001 is prevented from being directly put in the basket unit 200 through the article insertion box 2002 without reading the bar code of the article.

The second lid 2004 opens to cause the article 2001 to fall in the basket unit 200. The second lid 2004 may be manually opened by an operator, or may be automatically opened by a drive device (not shown). When the second lid 2004 is automatically operated, the second lid 2004 may be stopped for a predetermined period of time while the second lid 2004 is fully open, and, thereafter, a closing operation may be performed. In this manner, the article storing process is performed (t6).

The second lid 2004 is set in a closed state (t7). Like the first lid 2003, it can be checked by a lid opening/closing sensor (not shown) whether the second lid 2004 is set in a closed state or not. At this timing (t7), the state of the lid locking mechanism 2010 of the second lid 2004 is changed from a state "OPEN" to a state "LOCK".

The processes performed in a period between t2 and t7 are repeated each time an article purchasing process is performed. After the article purchasing process is ended, a payment process is performed (t8). When the payment process is completed (t9), the state of the lid locking mechanism 2011 of the third lid 2005 is changed from a state "LOCK" to "OPEN". In this manner, the third lid 2005 opens, an operator performs an operation of removing the article 2001 in the basket unit 200 (t10). After the removal of the article is completed, the third lid 2005 is closed.

The third lid 2005 is set in a closed state (t11). Like the first lid 2003, it can be checked by a lid opening/closing sensor (not shown) whether the third lid 2005 is set in a closed state or not. At this timing (t11), the state of the lid locking mechanism 2011 of the third lid 2005 is changed from a state "OPEN" to a state "LOCK". With this operation, the operator is regulated such that, after the payment is completed, the article 2001 is prevented from being put in the basket unit 200 by opening the third lid 2005.

As described above, according to the embodiment, when customer card information or ID information of a mobile phone is input, and when an article to be purchased is put in the basket unit 200 of the shopping cart 102, a bar code attached to the article is read. Article information based on the read bar code is acquired, and a checkout process of the cost of the article is performed on the basis of the acquired article information by using the customer card information or the ID information of the mobile phone. For this reason, the customer need not queue at a cash register, and the cash register itself is unnecessary. Therefore, the checkout process of the cost of articles to be purchased can be efficiently performed.

According to the embodiment, article information is acquired from the customer card information or the ID information of a mobile phone, the price of an article can be changed depending on the customer card information or the ID information of the mobile phone. Therefore, a checkout apparatus can efficiently perform a checkout process of the cost of an article to be purchased and setting and change of the price of an article can be performed to make it possible to achieve sales promotion.

According to the embodiment, the checkout apparatus communicates with the store server 104 to receive article information stored in the store server 104, and stores the received article information, and acquires article information from the received article information. For this reason, the latest article information can be rapidly acquired. Therefore, a checkout process of the cost of an article to be purchased can be efficiently performed.

According to the embodiment, all or some of acquired article information is displayed on the display screen 301, and information related to the cost of an article subjected to a checkout process is displayed. For this reason, a customer can be notified of the conditions of articles to be purchased or a status related to an amount of prices of the articles to be purchased.

According to the embodiment, the acquired article information is displayed on the display screen 301 as a list. For this reason, a customer can be easily notified of the condition of an article to be purchased, and can be prevented from forgetting to purchase an article.

According to the embodiment, since a total amount of cost of an article related to acquired article information is displayed on the display screen 301, a customer can be easily notified of information of an amount of prices of articles to be purchased, and can be designedly caused to perform selection and purchasing of the articles in relation to estimated cost.

According to the embodiment, identification information of an article to be purchased is input, and information related to a delivery address of the article related to the input identification information is input. The input identification information and the delivery address information are transmitted to the store server 104, and the article information of the article based on the input identification information is acquired. For this reason, when a normal article is purchased, a customer can be caused to purchase an article which cannot be put in the shopping cart together with other articles or an article which cannot be taken out.

According to the embodiment, information related to the measured weight of an article put in the basket unit 200 is input, and information related to the weight of the article related to the read article identification information is acquired. Since the weight of the input article is compared with a total amount of the acquired weight information, it can be easily determined that an article the identification information is not read is put in the basket unit 200. For this reason, mistakes or illegal acts in the checkout process can be prevented. In addition, since warning information is output on the basis of the comparison result, a customer, who is an operator can be notified that a checkout process is not correctly performed. For this reason, mistakes or illegal acts in the checkout process can be prevented.

According to the embodiment, since the checkout device 101 is arranged in the shopping cart 102, a checkout process of the cost of an article to be purchased can be efficiently performed. Furthermore, since the weight sensor 201 which measures the weight of an article put in the basket unit 200 is arranged on the bottom of the basket unit 200 of the shopping cart 102, the weight of the article put in the basket unit 200 can be easily known. The weight of the article can be easily compared with a calculated weight of an article the checkout process of which has been completed. For this reason, mistakes or illegal acts in the checkout process can be prevented.

According to the embodiment, the article removing lid (third lid) 2005 which opens or closes when the article 2001 put in the basket unit 200 is removed and the lid opening/closing control section (515 shown in FIG. 5) which controls the opening/closing operation of the third lid 2005 are arranged in the shopping cart 102, removal of an article from the basket section can be regulated. In this manner, an illegal act can be prevented.

The checkout method described in the embodiment may be a computer readable program which is prepared in advance. The program is executed by a computer such as a personal computer or a workstation to realize the checkout method. This program is recorded on a computer readable recording medium such as an HD (hard disk), an FD (flexible disk), a CD-ROM, an MO, or a DVD. The program is executed by being read by a computer. The program may be a transmittable medium which can be distributed through a network such as the internet.

As explained above, a checkout apparatus according to the present invention is arranged in a shopping cart and comprises an ID information inputting unit to input customer ID information; an article identification information reading unit that, when an article to be purchased is put in a basket section of the shopping cart, reads article identification information attached to the article; an article information acquiring unit that acquires article information of the article based on the article identification information read by the article identification information reading unit; and a checkout process unit that performs a checkout process of a cost of the article from the article information acquired by the article information acquiring unit by using the customer ID information input by the ID information inputting unit. Therefore, a customer need not queue at a cash register, and the cash register itself is unnecessary so that a checkout apparatus which can efficiently perform the checkout process of the cost of articles to be purchased and which can easily perform setting and change of the price of an article to make it possible to achieve sales promotion can be obtained.

Moreover, according to the present invention, the ID information inputting unit is a card information reading unit that reads, as the customer ID information, information recorded on various cards such as a credit card of the customer. Therefore, a checkout operation can be performed by various cards such as a credit card so that a checkout apparatus which can efficiently perform a checkout process of the cost of an article to be purchased can be obtained.

Moreover, according to the present invention, the ID information inputting unit is a connection unit that connects in a communicable manner the checkout apparatus to a mobile information terminal device of the customer. Therefore, a checkout operation can be performed by a mobile information terminal device so that a checkout apparatus which can efficiently perform a checkout process of the cost of an article to be purchased can be obtained.

Moreover, according to the present invention, the article information acquiring unit acquires the article information of the article from the customer ID information input by the ID information inputting unit. Therefore, a customer need not queue at a cash register, and the cash register itself is unnecessary so that a checkout apparatus which can efficiently perform the checkout process of the cost of articles to be purchased and which can easily perform setting and change of the price of an article to make it possible to achieve sales promotion can be obtained.

Moreover, according to the present invention, there are provided an article information receiving unit that communicates with a store server to receive article information stored in the store server; and an article information storage unit that stores the article information received by the article information receiving unit, wherein the article information acquiring unit acquires the article information from the article information storage unit. Therefore, latest article information can be rapidly obtained so that a checkout apparatus which can efficiently perform a checkout process of the cost of an article to be purchased and which can easily perform setting and change of the price of an article to make it possible to achieve sales promotion can be obtained advantageously.

Moreover, according to the present invention, there is provided a display unit that displays all or part of the article information acquired by the article information acquiring unit. Therefore, a customer can be easily notified of the condition of an article to be purchased or a state related to an amount of prices of articles to be purchased so that a checkout apparatus which can efficiently perform a checkout process of the cost of an article to be purchased and which can easily perform setting and change of the price of an article to make it possible to achieve sales promotion can be obtained.

Moreover, according to the present invention, the display unit displays the article information acquired by the article information acquiring unit as a list. Therefore, a checkout apparatus which can easily notify a customer of the condition of an article to be purchased and which can prevent from forgetting to purchase an article can be obtained.

Moreover, according to the present invention, the display unit displays a total amount of a cost of an article related to the article information acquired by the article information acquiring unit. A customer can be easily notified of information related to an amount of the prices of articles to be purchased, and can be designedly caused to perform selection and purchasing of the articles in relation to estimated cost. Therefore, a checkout apparatus which can achieve sales promotion can be obtained advantageously.

Moreover, according to the present invention, there are provided an article identification information inputting unit to input identification information of an article to be purchase; a delivery address information inputting unit to input information related to a delivery address of an article related to the identification information input by the article identification information inputting unit; and a transmitting unit that transmits the identification information input by the article identification inputting unit and delivery address information input by the delivery address information inputting unit to the store server, wherein the article information acquiring unit acquires the article information of the article from the identification information input by the article identification information inputting unit. In purchasing of regular articles, a customer can be caused to purchase an article which cannot be put in the shopping cart together with other articles or an article which cannot be taken out. Therefore, a checkout apparatus which can efficiently perform a checkout process of the cost of an article to be purchased and which can achieve sales promotion can be obtained advantageously.

Moreover, according to the present invention, there are provided a measured weight information inputting unit to input information related to a measured weight of an article put in the basket section; a weight information acquiring unit that acquires information related to the weight of an article related to the article identification information read by the article identification information reading unit; and a comparing unit that compares the weight of the article input by the measured weight information inputting unit with a total amount of the weight information acquired by the weight information acquiring unit. It can be easily determined that an article the identification information is not read is put in a basket section. Therefore, a checkout apparatus which can prevent mistakes or illegal acts in a checkout process and which can efficiently perform a checkout process of the cost of an article to be purchased can be obtained advantageously.

Moreover, according to the present invention, there is provided a warning information outputting unit that outputs warning information on the basis of a comparison result obtained by the comparing unit. A customer who is an operator can be notified that a checkout process cannot be correctly performed. Therefore, a checkout apparatus which can prevent mistakes or illegal acts in a checkout process and which can efficiently perform a checkout process of the cost of an article to be purchased can be obtained advantageously.

According to the invention, since the checkout apparatus according to the invention is arranged, a shopping cart which can efficiently perform a checkout process of the cost of an article to be purchased, which can easily perform setting and change of the price of an article to make it possible to achieve sales promotion can be obtained advantageously.

Moreover, according to the present invention, there is provided on the bottom of a basket section of the shopping cart, a weight measurement unit that measures the weight of an article put in the basket section. The weight of an article put in a basket section can be known, and the weight of the article can be easily compared with a total amount of calculated weights of articles subjected to a checkout process. Therefore, a shopping cart which can prevent mistakes or illegal acts in a checkout process and which can efficiently perform a checkout process of the cost of an article to be purchased can be obtained advantageously.

Moreover, according to the present invention, there are provided an article removal lid member that opens or closes when an article put in the basket section is removed; and a control unit that controls an opening/closing operation of the article removal lid member. A customer can be regulated such that an article is prevented from being removed from a basket section. Therefore, a shopping cart which can prevent illegal acts and which can efficiently perform a checkout process of the cost of an article to be purchased can be obtained advantageously.

Moreover, according to the present invention, a checkout method of performing a check out using a checkout apparatus that is arranged in a shopping cart, comprises an ID information inputting step of inputting customer ID information; an article identification information reading step of reading, when an article to be purchased is put in a basket section of the shopping cart, article identification information attached to the article; an article information acquiring step of acquiring article information of the article based on the article identification information read at the article identification information reading step; and a checkout process step of performing a checkout process of a cost of the article from the article information acquired at the article information acquiring step by using the customer ID information input at the ID information inputting step. A customer need not queue at a cash register to settle prices, and a cash register itself is unnecessary. Therefore, a checkout method which can efficiently perform a checkout process of the cost of an article to be purchased can be obtained advantageously.

Moreover, according to the present invention, the article information acquiring step includes acquiring the article information of the article from the customer ID information input at the ID information inputting step. Therefore, a checkout method which can change the price of an article depending on customer ID information and which can easily perform setting and change of the price of an article to make it possible to achieve sales promotion can be obtained advantageously.

Moreover, according to the present invention, there is provided a display step of displaying all or part of the article information acquired at the article information acquiring step. Therefore, a customer can be easily notified of the condition of an article to be purchased or a state related to an amount of prices of articles to be purchased so that a checkout method which can efficiently perform a checkout process of the cost of an article to be purchased and which can easily perform setting and change of the price of an article to make it possible to achieve sales promotion can be obtained.

Moreover, according to the present invention, the display step includes displaying the article information acquired at the article information acquiring step as a list. Therefore, a checkout method which can easily notify a customer of the condition of an article to be purchased and which can prevent from forgetting to purchase an article can be obtained advantageously.

Moreover, according to the present invention, the display step includes displaying a total amount of a cost of an article related to the article information acquired at the article information acquiring step. A customer can be easily notified of information related to an amount of prices of articles to be purchased, and can be designedly caused to perform selection and purchasing of the articles in relation to estimated cost. Therefore, a checkout method which can achieve sales promotion can be obtained advantageously.

Moreover, according to the present invention, there are provided an article identification information inputting step of inputting identification information of an article to be purchase; a delivery address information inputting step of inputting information related to a delivery address of an article related to the identification information input at the article identification information inputting step; and a transmitting step of transmitting the identification information input at the article identification inputting step and delivery address information input at the delivery address information inputting step to the store server, wherein the article information acquiring step includes acquiring the article information of the article from the identification information input at the article identification information inputting step. In purchasing of regular articles, a customer can be caused to purchase an article which cannot be put in the shopping cart together with other articles or an article which cannot be taken out. Therefore, a checkout method which can efficiently perform a checkout process of the cost of an article to be purchased and which can achieve sales promotion can be obtained advantageously.

Moreover, according to the present invention, there are provided a measured weight information inputting step of inputting information related to a measured weight of an article put in the basket section; a weight information acquiring step of acquiring information related to the weight of an article related to the article identification information read at the article identification information reading step; and a comparing step of comparing the weight of the article input at the measured weight information inputting step with a total amount of the weight information acquired at the weight information acquiring step. It can be easily determined that an article the identification information is not read is put in a basket section. Therefore, a checkout method which can prevent mistakes or illegal acts in a checkout process and which can efficiently perform a checkout process of the cost of an article to be purchased can be obtained advantageously.

According to the invention, a computer is caused to execute a checkout method according to the invention to advantageously obtain a computer program which can realize any one operation of the checkout method according to the invention by the computer.

INDUSTRIAL APPLICABILITY

A checkout apparatus, a shopping cart, and a checkout method according to the invention and a program which causes a computer to execute the method can efficiently perform a checkout process of the cost of an article to be purchased and can easily perform setting and change of the price of the article. Therefore, the checkout apparatus, the shopping cart, the checkout method, and the program are suitable for achievement of sales promotion.

The invention claimed is:

1. A shopping cart comprising:
a basket unit having a basket section and an upper side, said basket unit having an article insertion box disposed over a first part of the upper side of the basket unit,
said article insertion box having (i) an article insertion opening, a first lid and a first lock, said first lock and first lid providing a lockable/unlockable first lid member, covering said article insertion opening and (ii) an article conveying opening between said article insertion box and said basket unit, a second lid and a second lock, said second lock and second lid providing a lockable/unlockable second lid member covering said article conveying opening, and
wherein the basket unit comprises a third lid and a third lock, said third lock and third lid providing a lockable/unlockable third lid member, said third lid member being disposed over an article removal opening in a second part of the upper side of the basket unit; and a checkout apparatus configured to include:
an ID information inputting unit to input customer ID information;
an article identification information reading unit that, when an article to be purchased is put in a basket section of the shopping cart, reads article identification information attached to the article;
an article information acquiring unit that acquires article information of the article based on the article identification information read by the article identification information reading unit;
a checkout process unit that performs a checkout process of a cost of the article from the article information acquired by the article information acquiring unit by using the customer ID information input by the ID information inputting unit,
an article identification information inputting unit to input identification information of an article to be purchased;
a delivery address information inputting unit to input information related to a delivery address of an article related to the identification information input by the article identification information inputting unit; and
a transmitting unit that transmits the identification information input by the article identification inputting unit and delivery address information input by the delivery address information inputting unit to the store server,
a lid opening/closing control section configured to automatically control an opening/closing operation of the lockable first lid member, the lockable second lid member and the lockable third lid member,
wherein
the article information acquiring unit acquires the article information of the article from the identification information input by the article identification information inputting unit,
the lid opening/closing control section automatically opens the third lock of the lockable third lid member after the checkout process is completed,
said ID information inputting unit comprises one of (1) a card information reading unit that includes a card slot for receiving a customer card and reads, as the customer ID information, information recorded on said customer card and (2) a connection unit comprising a mobile communication unit port that connects in a communicable manner the checkout apparatus to a mobile information terminal device of the customer,
said checkout process unit is operative, upon completion of a checkout process for all articles, automatically to command one of (1) the card information reading unit to eject said customer card and (2) the connection unit to remove the connection of said mobile communication unit port, whereby power is automatically reduced or removed from said checkout apparatus, and
each lid has its own designated locking mechanism which is lockable and unlockable automatically without any direct manual locking mechanism actuating input.

2. The shopping cart according to claim 1, further comprising, a weight measurement unit that measures the weight of an article put in the basket section.

3. The shopping cart according to claim 1,
wherein the third lid member opens or closes when an article put in the basket section is removed.

4. The shopping cart according to claim 1, further comprising a lock controller for at least one of said first, second and third lid members, said lock controller being remotely controlled.

5. The shopping cart according to claim 1 wherein the opening/closing operation is controlled remotely.

6. The shopping cart according to claim 1 wherein the unlocking operation is accompanied by an opening operation that is controlled remotely.

7. A checkout method of performing a check out using a checkout apparatus that is arranged in a shopping cart comprising a basket unit having a basket section and an upper side, said basket unit having an article insertion box disposed over a first part of the upper side of the basket unit, said article insertion box having (i) an article insertion opening, a first lid and a first lock, said first lock and first lid providing a lockable/unlockable first lid member, covering said article insertion opening and (ii) an article conveying opening between said article insertion box and said basket unit, a second lid and a second lock, said second lock and second lid providing a lockable/unlockable second lid member covering said article, and
wherein the basket unit comprises a third lid and a third lock, said third lock and third lid providing a lockable/unlockable third lid member, said third lid member being disposed over an article removal opening in a second part of the upper side of the basket unit, comprising:
an ID information inputting step of inputting customer ID information;
an article identification information reading step of reading, when an article to be purchased is put in the basket section of the shopping cart through the article insertion opening by unlocking and opening the lockable/unlockable first lid member, article identification information attached to the article;
an article information acquiring step of acquiring article information of the article based on the article identification information read at the article identification information reading step;
a checkout process step of performing a checkout process of a cost of the article from the article information acquired at the article information acquiring step by using the customer ID information input at the ID information inputting step,
an article identification information inputting step of inputting identification information of an article to be purchase;
a delivery address information inputting step of inputting information related to a delivery address of an article related to the identification information input at the article identification information inputting step;
a transmitting step of transmitting the identification information input at the article identification inputting step and delivery address information input at the delivery address information inputting step to the store server, wherein the article information acquiring step includes acquiring the article information of the article from the identification information input at the article identification information inputting step;
a purchase determination step in which an affirmative indication of a purchase is provided and the second lock on the second lid member is automatically unlocked to release the article to the basket unit, and
a payment completion step in which an affirmative indication of payment for the article is provided into the checkout apparatus and the checkout apparatus automatically unlocks the third lock on the third lid member to permit retrieval of the article from the basket unit,
wherein said ID information inputting step comprises one of (1) reading, as the customer ID information, information recorded on a customer card and (2) connecting in a communicable manner a connection unit in the checkout apparatus to a mobile information terminal device of the customer;

wherein, upon completion of a checkout process for all articles, further automatically commanding one of (1) ejecting said customer card from a card information reading unit and (2) removing the connection of said mobile communication unit to said connection unit in the checkout apparatus, thereby automatically reducing or removing power from said checkout apparatus, and each lid has its own designated locking mechanism which is lockable and unlockable automatically without any direct manual locking mechanism actuating input.

8. The checkout method according to claim 7, wherein the article information acquiring step includes acquiring the article information of the article on the basis of the customer ID information input at the ID information inputting step.

9. The checkout method according to claim 7, further comprising a display step of displaying all or part of the article information acquired at the article information acquiring step.

10. The checkout method according to claim 9, wherein the display step includes displaying the article information acquired at the article information acquiring step as a list.

11. The checkout method according to claim 9, wherein the display step includes displaying a total amount of a cost of an article related to the article information acquired at the article information acquiring step.

12. The checkout method according to claim 7, further comprising:
a measured weight information inputting step of inputting information related to a measured weight of an article put in the basket section;
a weight information acquiring step of acquiring information related to the weight of an article related to the article identification information read at the article identification information reading step; and
a comparing step of comparing the weight of the article input at the measured weight information inputting step with a total amount of the weight information acquired at the weight information acquiring step.

13. The checkout method according to claim 7, further comprising remotely controlling the locking and unlocking of at least one of said first, second and third lid members.

14. The checkout method according to claim 7 wherein the unlocking operation is accompanied by an opening operation that is controlled remotely.

15. A non-transitory computer readable recording medium storing a program that causes a computer to execute a checkout method of performing a check out using a checkout apparatus that is arranged in a shopping cart comprising a basket unit having a basket section and an upper side, said basket unit having an article insertion box disposed over a first part of the upper side of the basket unit, said article insertion box having (i) an article insertion opening, a first lid and a first lock, said first lock and first lid providing a lockable/unlockable first lid member, covering said article insertion opening and (ii) an article conveying opening between said article insertion box and said basket unit, a second lid and a second lock, said second lock and second lid providing a lockable/unlockable second lid member covering said article, and wherein the basket unit comprises a third lid and a third lock, said third lock and third lid providing a lockable/unlockable third lid member, said third lid member being disposed over an article removal opening in a second part of the upper side of the basket unit, the computer causing the computer execute:

an ID information inputting step of inputting customer ID information;

an article identification information reading step of reading, when an article to be purchased is put in the article insertion box of the shopping cart, article identification information attached to the article;

an article information acquiring step of acquiring article information of the article based on the article identification information read at the article identification information reading step;

a checkout process step of performing a checkout process of a cost of the article from the article information acquired at the article information acquiring step by using the customer ID information input at the ID information inputting step, an article identification information inputting step of inputting identification information of an article to be purchase;

a delivery address information inputting step of inputting information related to a delivery address of an article related to the identification information input at the article identification information inputting step;

a transmitting step of transmitting the identification information input at the article identification inputting step and delivery address information input at the delivery address information inputting step to the store server, wherein the article information acquiring step includes acquiring the article information of the article from the identification information input at the article identification information inputting step;

a purchase determination step in which an affirmative indication of a purchase is provided and the second lock on the second lid member is automatically unlocked to release the article to the basket unit, and a payment completion step in which an affirmative indication of payment for the article is provided into the checkout apparatus and the checkout apparatus automatically unlocks the third lock on the third lid member to permit retrieval of the article from the basket unit, wherein each lid has its own designated locking mechanism which is lockable and unlockable automatically without an direct manual locking mechanism actuating input.

16. The non-transitory computer readable recording medium storing a program according to claim 15, wherein said ID information inputting step comprises one of (1) reading, as the customer ID information, information recorded on a customer card and (2) connecting in a communicable manner a connection unit in the checkout apparatus to a mobile information terminal device of the customer; and wherein, upon completion of a checkout process for all articles, further automatically commanding one of (1) ejecting said customer card from a card information reading unit and (2) removing the connection of said mobile communication unit to said connection unit in the checkout apparatus, thereby automatically reducing or removing power from said checkout apparatus.

* * * * *